(12) United States Patent
Thomas et al.

(10) Patent No.: US 6,671,756 B1
(45) Date of Patent: Dec. 30, 2003

(54) KVM SWITCH HAVING A UNIPROCESSOR THAT ACCOMODATE MULTIPLE USERS AND MULTIPLE COMPUTERS

(75) Inventors: Christopher L. Thomas, Madison, AL (US); Douglas D. Reed, Meridianville, AL (US); David H. Stafford, Huntsville, AL (US); Philip M. Kirshtein, New Market, AL (US)

(73) Assignee: Avocent Corporation, Huntsville, AL (US)

( * ) Notice: Subject to any disclaimer, the term of this patent is extended or adjusted under 35 U.S.C. 154(b) by 0 days.

(21) Appl. No.: 09/564,793

(22) Filed: May 5, 2000

Related U.S. Application Data

(60) Provisional application No. 60/132,926, filed on May 6, 1999.

(51) Int. Cl.[7] .................................................. G06F 13/10
(52) U.S. Cl. ............................ 710/73; 710/62; 710/220
(58) Field of Search .......................... 710/62, 100, 316, 710/63, 64, 72, 73, 105, 220, 260; 345/1.1, 156, 157, 163, 179

(56) References Cited

U.S. PATENT DOCUMENTS

| | | |
|---|---|---|
| 5,499,377 A | 3/1996 | Lee |
| 5,530,892 A | 6/1996 | Hwang |
| 5,721,842 A | 2/1998 | Beasley et al. |
| 5,884,096 A | 3/1999 | Beasley et al. |
| 6,237,025 B1 * | 5/2001 | Ludwig et al. ............. 709/204 |
| 6,314,479 B1 * | 11/2001 | Frederick et al. ............. 710/63 |

OTHER PUBLICATIONS

"Autoboot Commander 1xp™ & 4xp™" Installer/User Guide, 5th Edition, Cybex Computer Products Corporation, Huntsville, Alabama, Sep., 1998.
"Microcomputer Components, C163–16F," Siemens, DataSheet 11/97.
"IBM Personal System/2, Mouse Technical Reference," 68X2229, S68X–2229–00.
Kliegelhofer, P., "Microcontrollers ApNote (AP1638)," Bootstrap Loader on C163 Flash, Siemens, 8–97.
"ServeView" Brochure, Rose Electronics, Houston, TX, Mar. 1998.
"Products" Advertisement, Rose Electronics, Houston, TX, May 2000.

* cited by examiner

*Primary Examiner*—Dennis M. Butler
*Assistant Examiner*—Thuan Du
(74) *Attorney, Agent, or Firm*—Davidson Berquist Klima & Jackson LLP

(57) ABSTRACT

A KVM switch having a uniprocessor architecture that accommodate multiple users and multiple computers—even multiple users to a single computer—via interrupt servicing provides dramatic improvements over common matrix-type KVM switches. Further, such features as hot-plugging computers, and keep alive computers (during power outages) are not inhibited by the present architecture. OSD menuing is accommodated, even as to both users, and OSD configurations are field upgradeable using flash memory downloading. The present architecture also accommodates tiered arrangements.

17 Claims, 11 Drawing Sheets

KVM SWITCH HAVING A UNIPROCESSOR THAT ACCOMODATE MULTIPLE USERS AND MULTIPLE COMPUTERS

CROSS REFERENCE TO RELATED CASES

This application is a continuation of U.S. Provisional Patent Application No. 60/132,926, filed May 6, 1999, which is incorporated in its entirety herein by reference.

This application is related, in part, to U.S. Provisional Patent Application Ser. No. 60/043,085, filed Apr. 8, 1997 entitled "Biphase Coded Computer Peripheral Extension System," the entire disclosure of which is incorporated herein by reference. This is also related to U.S. application Ser. No. 08/971,223, now U.S. Pat. No. 6,185,643 filed Nov. 15, 1997, entitled "A Method and Apparatus for Extending Computer Peripherals," the entire disclosure of which is incorporated herein by reference.

FIELD OF THE INVENTION

This invention relates to data switches, and more particularly to multi-user keyboard, video, and mouse (KVM) switches.

BACKGROUND AND SUMMARY OF THE INVENTION

Keyboard/mouse/video switches are well known for allowing a keyboard, workstation and video monitor to interact with a selected one of several computers. Although known KVM switches take a variety of forms, their essential purpose is to allow a workstation (consisting of, generally, a keyboard, mouse and monitor) to interact with a selected computer such that the computer receives and transmits understandable signals to and from the various workstation components regardless of the data protocol schemes employed by either the selected computer or the workstation devices. Typical KVM switches allow the user of the workstation to switch access between various ones of the number of associated computers.

The KVM switch box will typically have at least one port for the workstation devices to provide and receive signals from the switch, together with a series of computer ports by which each of the associated computers is linked to the switch. Most KVM switches employ a single user (single workstation) architecture in which a single keyboard, video, and monitor may access multiple numbers of computers, but the prior art is not limited to such architectures. Matrix type KVM switches are also known which provide switch or router type functions to connect any one of several associated workstations with any one of several associated computers.

Thus, KVM switches, some of which are matrix switches, are manufactured commercially by companies including Cybex Computer Products Corporation of Huntsville, Ala., Apex PC Solutions of Washington, The CCC Group of England, and Rose Electronics of Houston, Tex.

The present KVM switch provides an alternative architecture for multi-user, multi-computer connections that provides substantial advantages over prior architecture. In particular, the present KVM switch is characterized by a single KVM processor by which many of the multiple users can access one or more of the different computers, even simultaneously to any one given computer. The single processor provides for processing efficiencies and permits the preferred KVM switch to poll the user ports and computer ports via interrupt routines in order to obtain next available data to be switched.

In an example embodiment, the KVM switch also provides access to a user that is local to the switchbox and access to another user that is remote from the switchbox. In this alternative embodiment, the remote user communicates with the switchbox via, preferably, a CAT5 cable communicating with an integrated extension product within the KVM switchbox and an external extension product near the user station. Of course, the KVM switch can employ fiber optic cable, an integral waveguide, or a wireless connection in lieu of the CAT5 connection. The CAT5 connection may be arranged in accordance with U.S. patent application Ser. No. 08/971,223 now U.S. Pat. No. 6,185,643, incorporated above.

With the single processor architecture, other special features may be employed in the preferred KVM switch. These include the use of a FLASH memory to load several different default on-screen display activation sequences and OSD configurations into the KVM switch. That is, different KVM switch types can call the pop-up on-screen-display menu using different keystroke sequences. The presently described FLASH memory contains predetermined sequences that may be used for calling up on-screen-displays in accordance with predetermined keyboard sequences, which sequences (and other configuration parameters) can be charged by flash memory download.

The single processor also provides solutions to particular issues associated with providing simultaneous access by two users to multiple computers. For example, the preferred embodiment includes solutions for a single processor to monitor keyboard and clock lines for eight different computer ports. Further, the preferred embodiment employs provisions for dealing with different kinds of mouse protocols that may exist when two different mouse controllers are connected to a common computer. In the preferred embodiment, the KVM switch employs a hierarchical ranking system for the mice, as described in U.S. patent application Ser. No. 09/564,794, now U.S. Pat. No. 6,256,014 filed on May 5, 2000, entitled "Mouse Ranking System".

These, as well as other objects and advantages of this invention, will be more completely understood and appreciated by careful study of the following more detailed description of a presently preferred exemplary embodiment of the invention taken in conjunction with the accompanying drawings, of which:

DETAILED DESCRIPTION OF THE PRESENTLY PREFERRED EMBODIMENT

Figure 1:
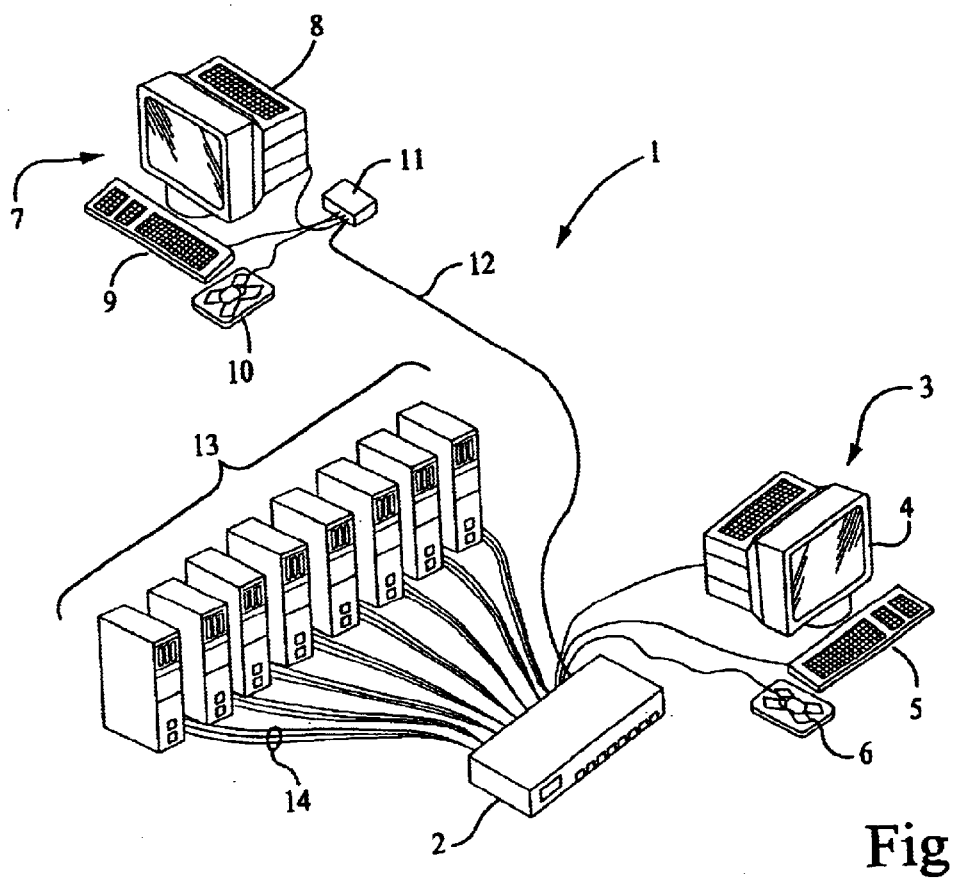
FIG. 1 is a schematic representation of an example embodiment of the present invention.

A typical example installation of the present invention is shown in FIG. 1. There, system 1 includes a KVM switch 2 accommodating user workstation 3 being relatively close (for example, up to 30 feet away) to the KVM switch 2. The workstation 3 includes keyboard 5, mouse 6, and monitor 4.

The KVM switch 2 also accommodates a second workstation 7 that may be relatively far from the KVM switch 2 (for example up to 500 feet away), which workstation 7 includes keyboard 9, mouse 10, and monitor 8. In order to accommodate the relative distance between the workstation 7 and the KVM switch 2, an extender product 11 (described in more detail below) interfaces between the workstation 7 and the KVM switch 2. The extender 11 is coupled to the KVM switch 2 via a long line 12. The line 12 may be, in a preferred embodiment, a CAT5 cable, a fiber optic cable, etc.

A KVM switch 2 operates to communicate keyboard, video, and mouse signals to and from the workstations 3 and 7 and a set of computers 13. Each computer 13 is coupled to the KVM switch 2 via communication lines 14.

In the example of FIG. 1, the KVM switch 2 performs as a complete 2x8 matrix switch, with both users independently accessing any of the eight attached PCs at the same time.

As described in further detail below, the switch 2 is also FLASH upgradable, meaning that the firmware in the switch 2 may be updated at any time through a simple serial connection between a PC and the KVM switch.

The switch 2 provides essentially unlimited support for different mouse types 6/10, different keyboard types 5/9, different monitor types 4/8, and different computer types 13. For example, the switch 2 is compatible with IBM PC/AT and PS/2 systems, SUN systems, etc. It is also compatible with VGA, SVGA, XGA and XGA-II video signals. PS/2 and SUN keyboards are accommodated, as are PS/2 Intellimouse, IBM ScrollPoint, Logitech Mouse Man+, Logitech Marble+, Logitech Marble FX, and Kensington Expert Mice, etc. The switch 2 provides plug and play video compliant with VESA DDC2B standards.

Figure 3:
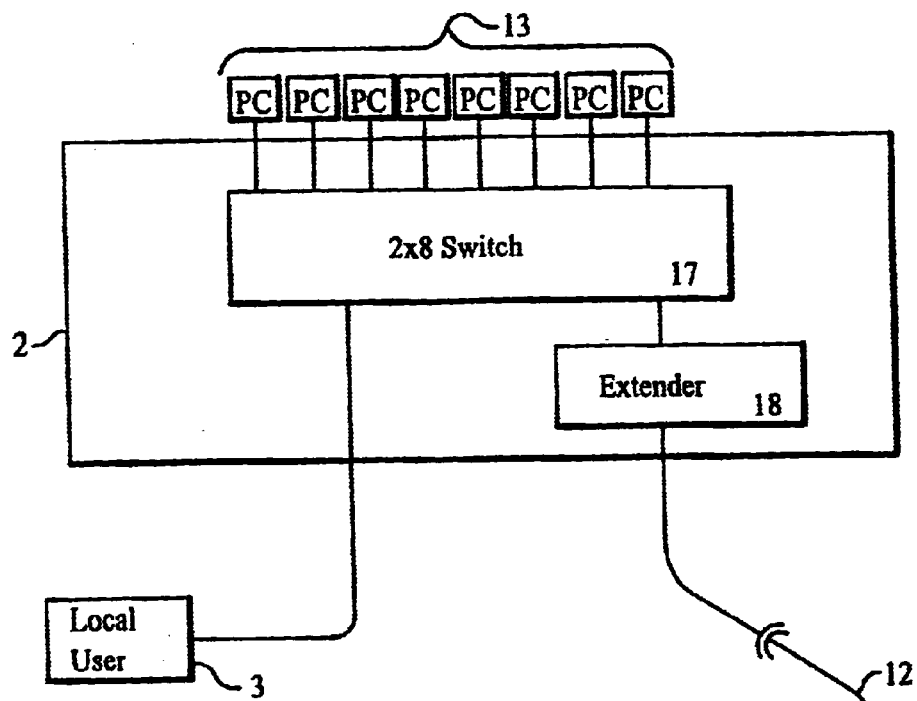
FIG. 3 is a schematic representation of another example embodiment of the present invention.

The extender product 11 can be a receiver of the type commercialized by Cybex under the name "Longview," as shown in FIG. 3. Also shown in FIG. 3, the switch 2 includes a corresponding extender 18 internal to the switch 2 to communicate as a transmitter/receiver with the extender 11 via the cable 12. The combination of the built in extender 18 into the switch 2 permits the remote user 7 to communicate with the switch 2 via relatively long distances (for example, up to 500 feet).

The switch 2 features mouse translation capability in which mouse types 6/10 may employ data protocols different from a designated computer 13, in which case the switch 2 translates the mouse protocol between the selected computer 13 and the mouse 6/10. This allows any mouse to work with any attached PC, regardless of whether the computer is necessarily compatible with the particular mouse type.

Consistent with common KVM switches available on the market, the switch 2 employs both "keep alive" features which allow the attached computers 13 to power the switch 2 in the event that the switch 2 experiences a power failure. This prevents the attached PCs 13 from locking up and avoids the loss of time and data. Further, the switch 2 employs other common features such as multi-level security to configure and control server access for each type of user in the system, with an administrator function providing administrators with fuller access privileges and individual users with restricted access privileges such as viewing access, viewing/editing access, etc.

The switch 2 may employ on-screen display capability in which the switch 2 may be configured and controlled with on-screen menuing. In the on-screen menu, computer channels may be named with custom names, and selected via a graphical menu. Secondary menus may permit the user to configure and initiate channel scanning in other system features. An OSD configuration utility also allows the administrator to easily configure and download a channel list with defined users and access privileges for an entire system. This utility will also read and save a current configuration for added security.

An autoboot feature in the switch 2 boots all attached computers 13 during an initial power up or after a power failure. PCs 13 are booted transparently without any operator intervention and may be powered up one-at-a-time or all at once. Once the power stabilizes, a channel may be selected by a user of a workstation 3/7.

A built in scanning feature of switch 2 permits the user to automatically monitor, or scan, PCs 13 without intervention. When keyboard activity is detected, scanning is suspended until all activity stops, whereupon scanning is resumed with the next channel and sequence.

Figure 2:
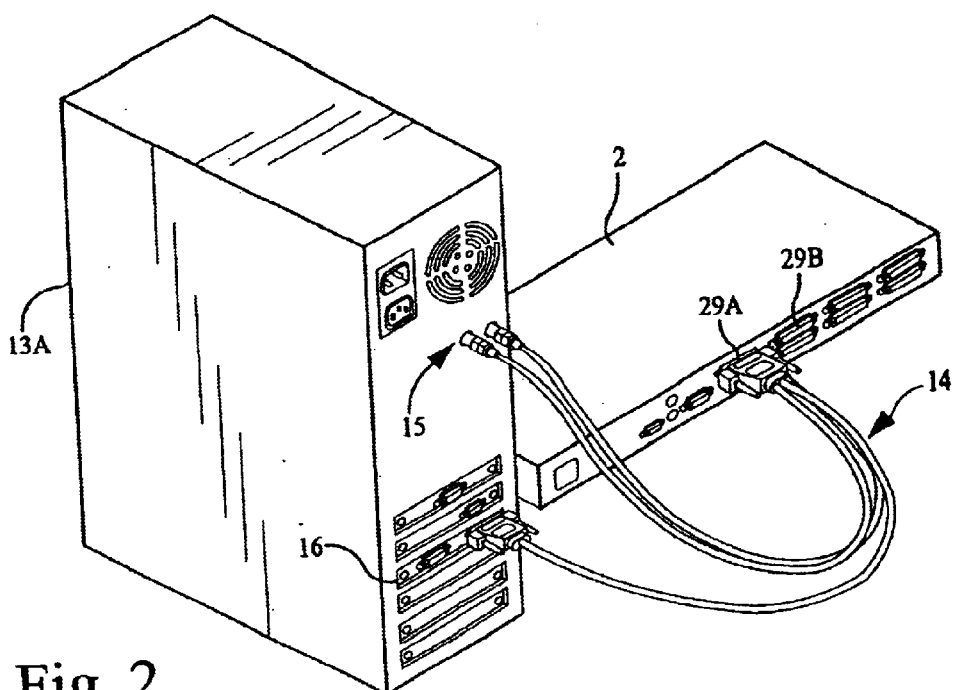
FIG. 2 is an example embodiment of a KVM switch to PC connection in accordance with an example embodiment of the present invention.

The connections between the switch 2 and the computers 13 are illustrated in FIG. 2. There, one of the computers 13, namely computer 13A is illustrated connected to the switch 2 via cable 14. The computer 13A is a standard over-the-counter computer having keyboard and mouse ports 15 and a video card having external video ports 16. Cable 14 includes standard keyboard and mouse connectors to connect into keyboard mouse port 15 and a standard video monitor cable to connect into the video port 16. At an opposite end of the cable 14, the cables are connected to a computer port 29A of the switch 2. Eight computer ports are provided in the illustrated switch 2 of FIG. 2, although any number of other ports can be supported by the present invention, depending only on the architecture desired. Thus, although the 2×8 switch in FIGS. 1 and 2 is used for illustrative purposes, any other combination of user numbers and computers numbers can be accommodated by the switch 2.

Using the connections of FIG. 2, the switch 2 provides keyboard, mouse, and monitor signals via the port 29A to the computer 13A via the cable 14. The computer 13A receives the keyboard, mouse, and video signals (and also transmits appropriate signals to the switch 2) such that the computer 13A is unaware that it is speaking to a KVM switch 2 rather than to an actual keyboard, video, and mouse peripheral. Thus, the switch 2 provides the necessary initiation procedures for the keyboard, mouse, and video protocols demanded by the computer 13A during its boot-up operation.

Although not shown in FIG. 2, the cable 14 can include other alternative ends for other types of mice and keyboards such that the cable 14 may be a standard cable for multiple different kinds of keyboards/mouse/video ports. Thus, in an example embodiment, the cable 14 can have a 25 pin "D" connector at the end connecting port 29A. The other end of the cable 14 may have, in this example embodiment, five connectors: a fifteen pin "HDD" connector for video (to connect video port 16), a five pin DIN/6 pin mini DIN connector for an AT or PS/2 keyboard connection and a 9-pin serial/6-pin mini DIN connector for a serial or PS/2 mouse connection. The PS/2 mouse connector can be designated by an appropriate tag. Then, only those keyboard and mouse connectors that are appropriate for the PC 13 are used in the ports 15, and the remaining connectors are left unconnected.

Figure 5:
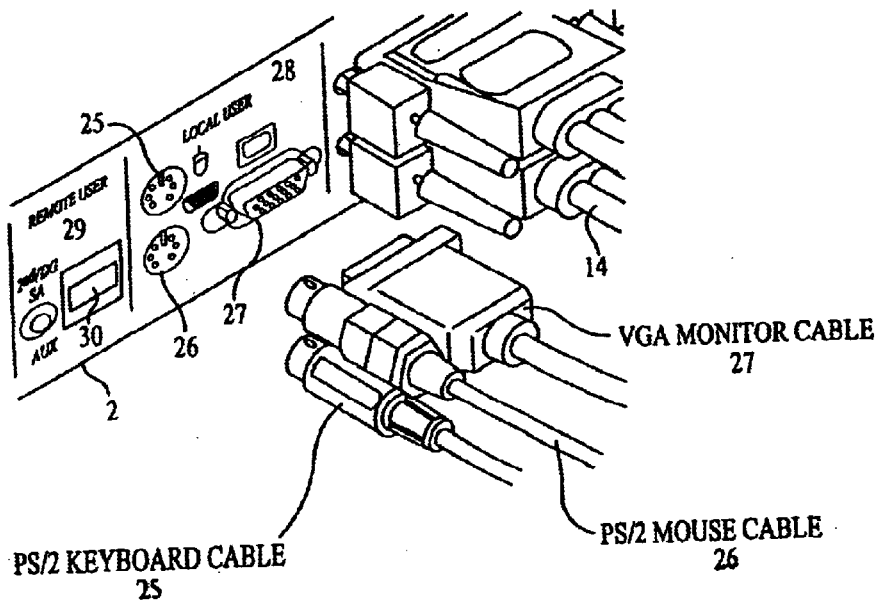
FIG. 5 is a schematic representation of the connection between a KVM switch in accordance with an example embodiment of the present invention and a workstation.

The connections of FIG. 2 are then repeated for each of the computers 13 shown in FIG. 1, being attached to respective ports 29A, 29B, etc. of switch 2. FIG. 2 thus shows the connections between the switch 2 and the computers 13. On the other side of the switch, the connections between the local user 3 and the switch 2 are shown in FIG. 5. There, switch 2 includes section 28 for local user connections that accommodate the keyboard/video/mouse connections from workstation 3. A cable from keyboard 5 is shown in FIG. 5 as PS/2 keyboard cable 25, which connects to keyboard port 26 of the switch 2. The mouse 6 employs PS/2 mouse cable 26, which is plugged into mouse port of switch 2. Finally, the monitor 4 includes VGA monitor cable 27, which is connected to the video port 27 of the switch 2. The combination of the cables 25, 26, and 27 connected into the local user section 28 of the switch 2 provides the connections shown in FIG. 1 between the workstation 3 and KVM switch 2.

Thus, in operation, keyboard and mouse signals from the keyboard 5 and mouse 6 of user station 3 are sent directly to the KVM switch 2 into ports 25 and 26. Switch 2 receives the keyboard/mouse signals, makes appropriate translations, and delivers them to the selected computer 13A via cable 14 into ports 15 (FIG. 2). Computer 13A acts on the keyboard and mouse signals received at its port 15 and creates new video in response to the keyboard/mouse signals, which video signals are provided from port 16 through cable 14, into switch 2. Switch 2 then makes appropriate video translations and delivers the video signals to port 27 (FIG. 5) onto cable 27, which delivers the video signals to the monitor 4.

Figure 4:
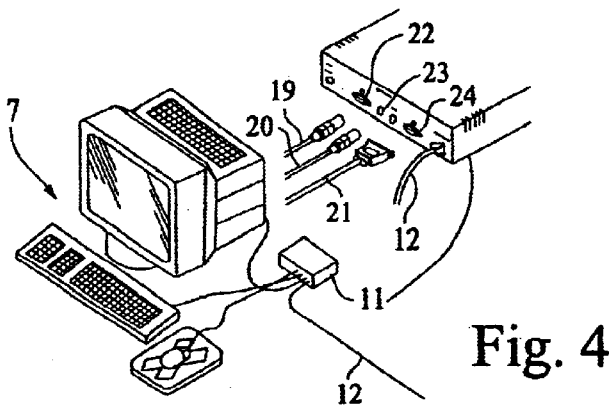
FIG. 4 is a representation of an extender product in accordance with the present invention.

The remote user 7 also connects to the switch 2, but does so in accordance with the description shown in FIG. 4. As shown in FIG. 4, a standard category 5 unshielded twisted pair cable (up to 500 feet) is plugged from an RJ-45 style modular jack 30 (FIG. 5) at the remote user section 29 of switch 2. In the preferred embodiment, when using category 5 cable, the cable should be terminated to the EIA (TIA) 568B standard, commonly used for 10-base T Ethernet, although other type terminations and cable are contemplated by the present invention.

As shown in FIG. 4, the CAT5 cable 12 connects into the extender 11, which also includes keyboard port 22, mouse port 23, and video port 24. Keyboard cable 19 from keyboard 9 connects into the keyboard port 22 of extender 11, mouse cable 20 connects into mouse port 23 of extender 11, and video cable 21 from monitor 8 connects into the video port 24 of extender 11. The extender 11 provides long distance peripheral transmission/reception. In a preferred embodiment, the extender 11 is a longview transmitter/receiver marketed by Cybex Computer Products Corporation of Huntsville, Ala.

Figure 6:
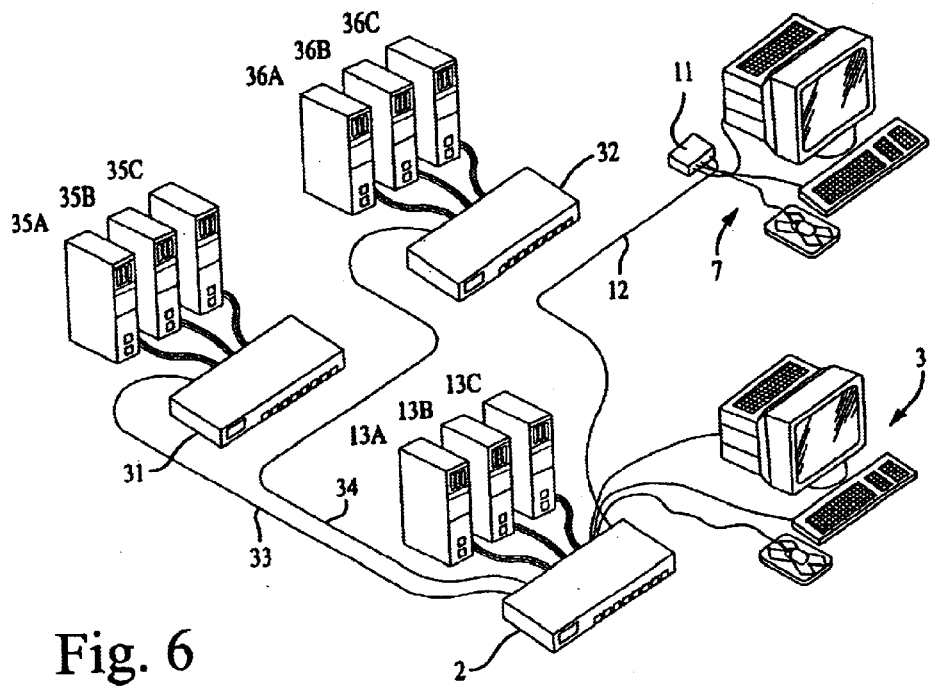
FIG. 6 is a schematic representation of an example embodiment of the present invention having scaled KVM switches.
Figure 7:
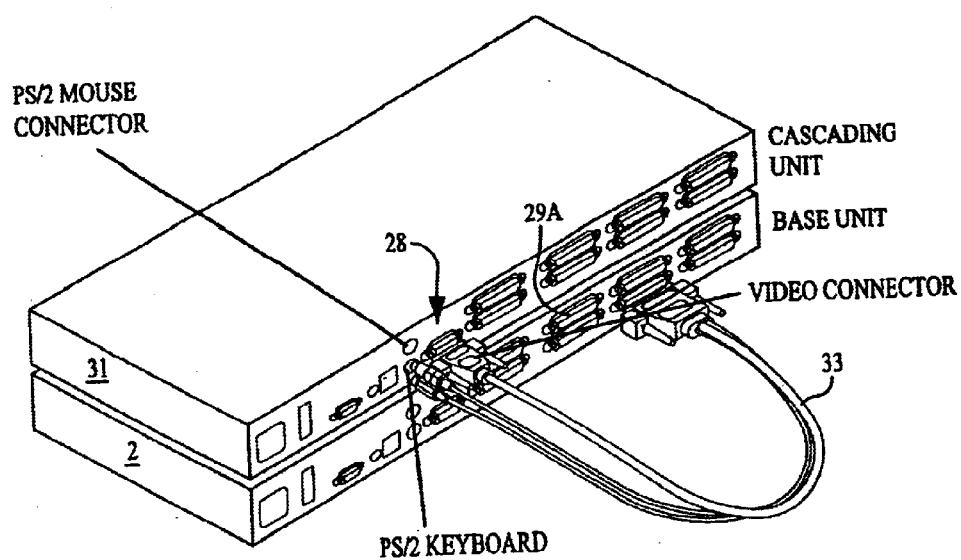
FIG. 7 is an example embodiment of the scaled KVM switches of FIG. 6.

When more than eight computers 13 are to be employed using the switch 2 of the preferred embodiment (2×8), the cascading embodiment of FIGS. 6 and 7 can be employed. As shown in FIG. 6, switch 2 connects to remote station 7 and local station 3 as described previously with respect to FIGS. 1–5. Switch 2 also connects to computers 13A–13C in the same way described above. To permit workstations 3 and 7 to communicate with greater than eight computers, the switch 2 is cascaded by connecting two additional switch units 31 and 32 via communications lines 33 and 34. Switch 31 couples to additional computers 35A–35C, and switch 32 couples to additional computers 36A–36C. As shown in FIG. 6, the cascading arrangement allows the users 3 and 7 to communicate with more computers than would be permittable by the single switch 2.

In the cascading embodiment of FIG. 6, the switches 2, 31, and 32 were connected in the manner shown in FIG. 7. Switch 2 includes the computer ports 29A, etc. (reference FIG. 2), which connect to computers 13A–13C. In the cascading arrangement, one of the computer ports of the switch 2 is coupled to the cascaded switch 31 via the cable 33. On one end of the cable 33 a coupler connects to one of the computer ports 29A and the other end of the cable 33 couples to the local user section 28 of the switch 31, in the same manner as shown in FIG. 5. The respective switches 2, 31, 32, etc. recognize each other on their computer ports 29A in a manner described later with respect to FIG. 18. Thus, if user 3 (FIG. 6) desires to select computer 36A, the switch 2 will know that computer 36A is associated with switch 32 and will transfer all keyboard/video/mouse signals to the switch 32 via cable 34 for switching to the computer 36A. To the user of workstation 3, the transfer is completely transparent.

In any of the embodiments of FIGS. 1–7, the computers can be switched by the users via hard buttons on the switch, hot key sequencing, or on-screen display selection.

Referring again to FIG. 1, for reasons that will be understood after review of the architecture (software and hardware) below, the users of both of the workstations 3 and 7 may access any of the computers 13 independently at the same time. The workstations 3 and 7 may also share access to any one of the computers 13 through the switch 2. In the sharing situation, both workstations 3 and 7 view a computer channel at the same time on a respective monitor 4 and 8. The switch 2 ensures that only one workstation 3/7 enters data through the keyboard 5/9 or mouse 6/10 at any given moment, to avoid lock-ups. But, once the active workstation stops a keyboard and mouse activity, the other workstation can take control of the computer and enter data through its keyboard and mouse. Thus, both workstations 3 and 7 have immediate and shared access to all computers 13 (with the caveat that the switch 2 will prevent absolutely simultaneous data entries into the same computer at the same moment).

Figure 21:
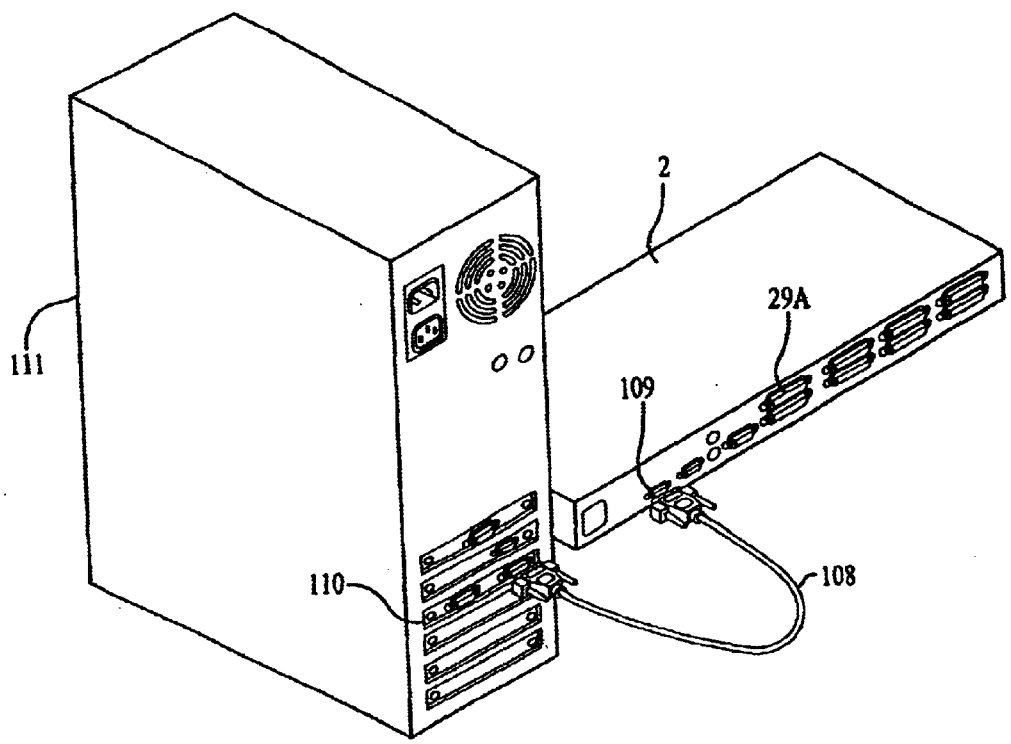
FIG. 21 is a perspective representation of a FLASH memory upgrade in accordance with the present invention.

The switch 2 incorporates a number of features that require upgrading over time. For example, OSD configuration parameters for particular users are described in the section "OSD Configuration Utility" of U.S. Patent Application No. 60/132,926 (previously incorporated by reference), and include such parameters as channel names, display positioning and attributing, display dwell times per channel, required flag responses per channel, user names, user passwords, user login time-outs, user access restraints, etc. The configuration parameters may even be updated and modified over time such that new and improved configuration parameters are employed and made effective by the KVM switch. As these new configuration protocols are developed, the present invention, as shown in FIG. 21, can provide FLASH memory on the switch 2 to permit the firmware of the switch 2 to be upgraded. To upgrade the FLASH code on the switch 2, new FLASH firmware can be downloaded from the computer 111 to the switch 2 via a cable 108. The cable 108 is a serial cable connecting the PC 111 to the switch 2 between a set-up port 109 on the switch 2 and a serial port 110 on the computer 111. The computer 111 uses some form of terminal software to permit the computer to communicate with the switch 2. Any commercially available terminal software can suffice. The FLASH upgrade is generally activated through the on-screen-display menu of the switch 2 by selecting a menu item for FLASH upgrade. The FLASH file from the computer 111 is generally transferred as a text file to the switch 2.

Of course, the FLASH upgrade to the switch 2 need not occur from the PC 111 to the switch, but can occur via any other type of communication means, such as through a network (via the port 109), via an Internet, via an IR transfer, etc.

Figure 8:
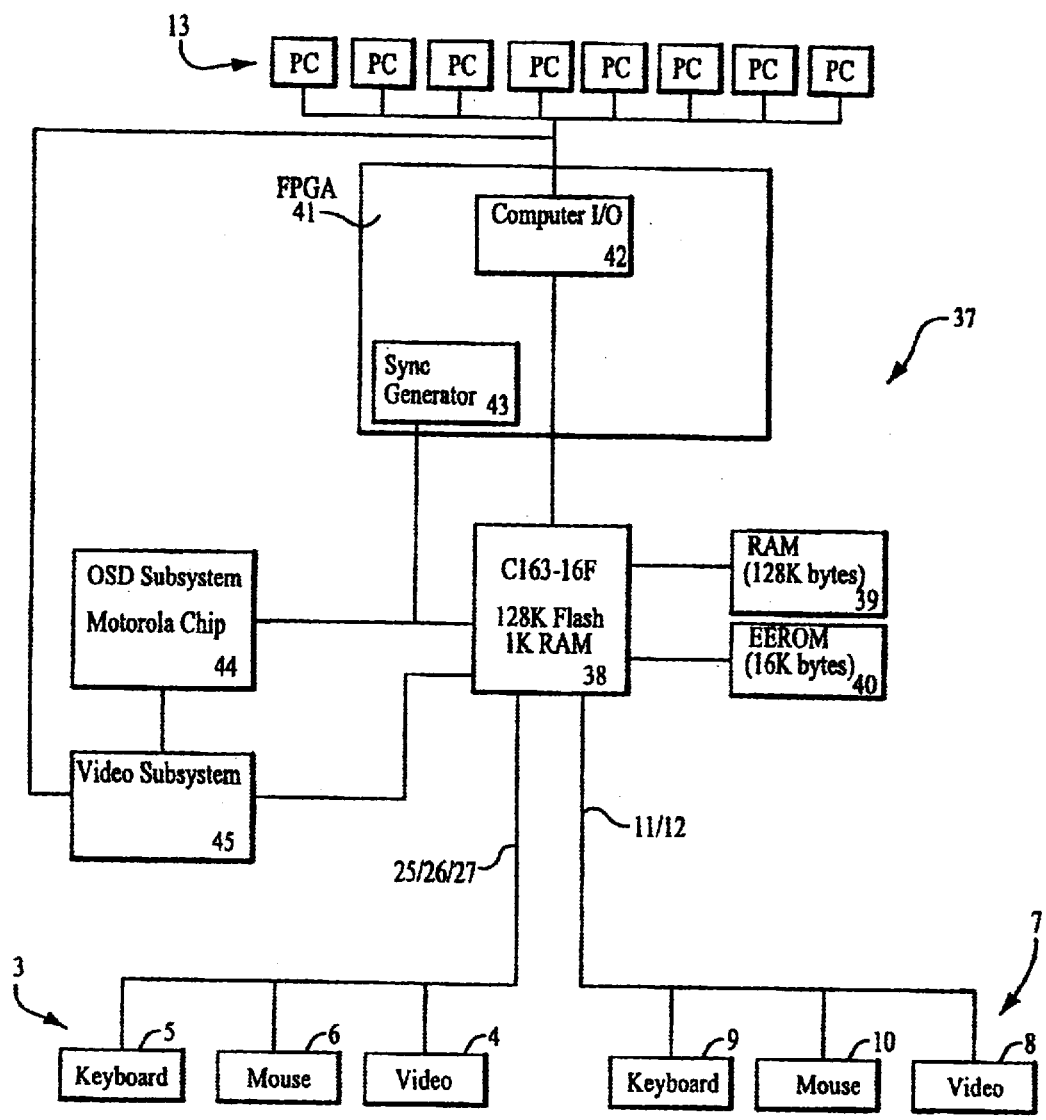
FIG. 8 is an electrical schematic diagram of an example architecture in accordance with the present invention.

FIG. 8 illustrates an example hardware architecture of a KVM switch in accordance with the present invention. In FIG. 8, the switch 37 is implemented as a single processor architecture. In the embodiment of FIG. 8, the switch 37 can be embodied in the KVM switch 2 of FIG. 1. In such a case, workstations 3 and 7 will communicate with the KVM switch 37, just as they communicated with the KVM switch 2 in FIG. 1. Signals from the workstation keyboard 5/9, mouse 6/10, and video monitor 4/8 of the workstations 3/7 are provided to the switch 37 via lines 25/26/27 (FIG. 5) and 11/12 (FIG. 1). The workstation signals are provided to the single processor 38. The processor 38 can, in an example embodiment, be a processor in the Siemens 167 family, such as the Siemens C163-16F processor. The processor 38 may, in the example embodiment of FIG. 8, include FLASH memory and local RAM. Those of ordinary skill in the art will understand that additional RAM memory 39 and EEROM memory 40 also communicate with the single processor 38 to provide additional external memory.

Between the single processor 38 and the PCs 13 is a FPGA 41. Embodied in the FPGA is a computer I/O 42 providing input/output interfacing between the processor 38 and the PCs 13, as will be described in greater detail below. FPGA 41 also provides a sync generator 43 for synchronization of the OSD subsystem 44 to the processor 38. The OSD subsystem 44 can be a standard Motorola OSD chip.

A video subsystem 45 receives video signals directly from PCs 13 and inputs them to the processor 38, with appropriate OSD menuing overlays received from the OSD subsystem 44.

In operation, keyboard and mice signals are provided from the workstations 3/7 to the processor 38 with destinations to one or more of the PCs 13. The processor 38 applies the keyboard and mouse signals to the appropriate PC ports for the PCs 13 via the computer I/O 42. Meanwhile, video signals from the PCs 13 are received from the PC ports of the switch 2 and are input to the video subsystem 45. The subsystem 45 provides video signals to the processor 38, which applies them to the appropriate lines 27 or 12 for destination to the video monitors 4 or 8. Of course, if an OSD menu has been activated, the OSD subsystem 44 will provide the OSD menu to the video subsystem 45, which will overwrite the menus onto the video signal being provided by the PCs 13.

As will be described in greater detail later, the architecture 37 is novel in that the processor 38 does not act only as a matrix switch providing "hardwire" connections between workstations 3/7 and selected PCs 13. Instead, the processor 38 will allow both workstation signals 3/7 to be received by even a single PC 13. This allows two different users to access the same PC at the same time and to employ keyboard and mouse access to the same PC. Thus, unlike a pure matrix switch in which one workstation communicates with one PC and another workstation can communicate with another PC, the present architecture and methodology permits a single processor to provide shared access and shared control between multiple workstations in a single PC, as well as between multiple workstations and respective independent PCs.

Figure 9:
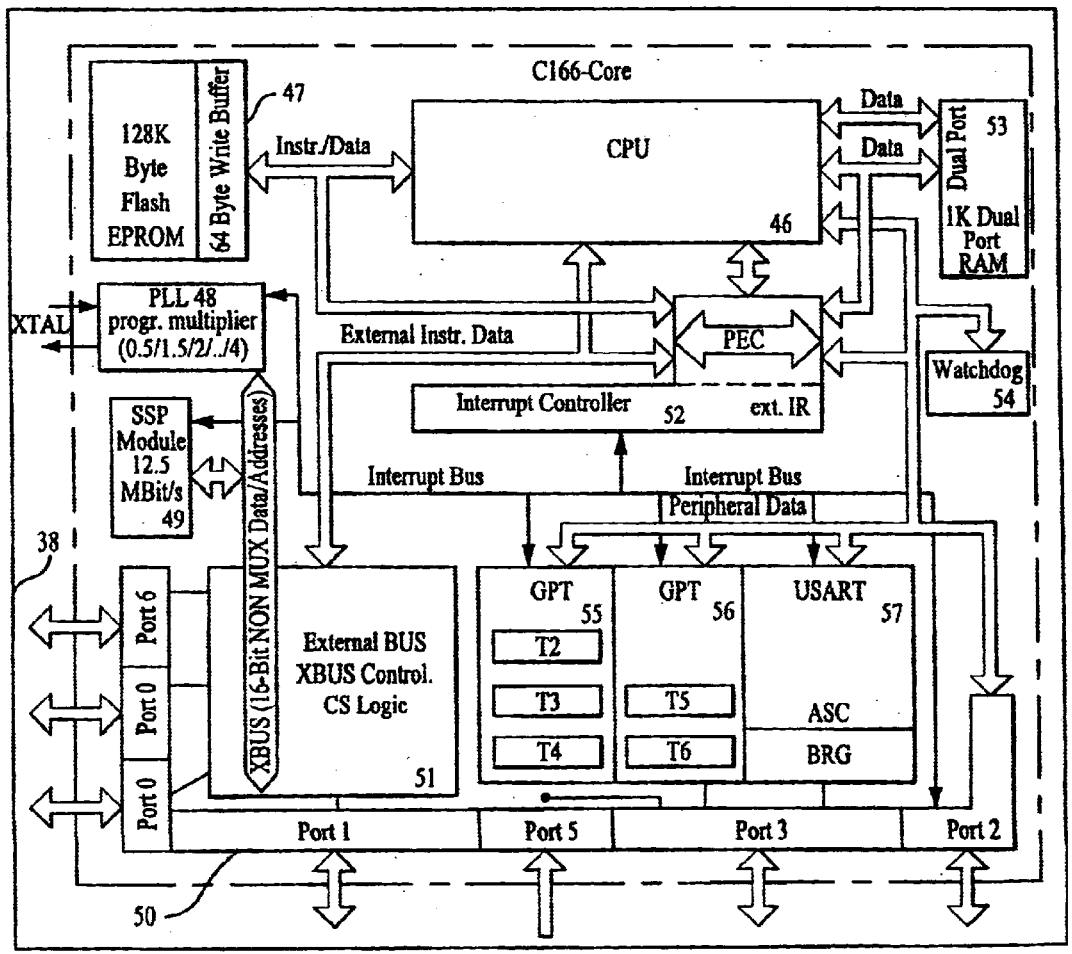
FIG. 9 is a prior art micro-processor that may be employed in the example embodiment of FIG. 8.

FIG. 9 illustrates an example embodiment of the processor 38, namely the Siemens C163-16F processor architecture. The processor shown in FIG. 9 is a known processor applied in the novel way of FIG. 8. The processor of FIG. 9 is shown and described in Siemens, *Microcomputer Components, 16-bit SMOS Microcontroller C163-16F* datasheet, published Jan. 11, 1997, the entire contents of which are incorporated herein by reference. Since the fundamental operation of the microcontroller 38 will be readily apparent to those of ordinary skill in the art from a review of FIG. 9 and of the Siemens datasheet, for purposes of brevity, only a brief recitation of the functions of the microcontroller are described below with respect to FIG. 9. In the processor 38, a CPU 46 provides core processing functions. The FLASH memory referred to previously (with respect to FIG. 8) is maintained in buffer 47, which communicates with the CPU 46 and the interrupt controller 52. Alternatively, the FLASH memory can be external to the processor 38 and still be within the ambit of the presently contemplated inventions. Internal RAM (also described earlier with respect to FIG. 8) is shown in FIG. 9 as element 53 communicating with the CPU 46 and interrupt controller 52. Watch dog circuit 54 is also provided in communication with the CPU 46 and interrupt controller 52. The microcontroller includes several I/O ports 50. Port0, Port1, and Port6 provide bi-directional communication from external devices to the CPU 46 via external bus 51 and external instruction databus therebetween. Clark generation is provided via PLL 48 via either direct or pre-scaled clock input. Two multi functional general purpose timer ("GPT") units 55 and 56 are provided with 5 timers T2–T6. Each GPT unit 55/56 represents a flexible multi-functional timer/counter structure used for different time related tasks such as event timing, counting sync generation, etc. Serial communication with other microcontrollers, processors, terminals or external peripheral components is provided by asynchronize/synchronize serial channel ASC of USART 57 and by synchronize serial port SSP 49.

The Interrupt Controller 52 provide a very fast interrupt response reaction to service requests that can be generated from various sources internal or external to the microcontroller. Any of these interrupt requests can be programmed to being serviced by the Interrupt Controller or by the Peripheral Event Controller (PEC).

In microprocessor 38, the current program execution is not suspended during a branch to the interrupt vector table. Instead, one cycle is taken from current CPU 46 activity to perform a PEC service. A PEC service implies a single byte or word data transfer between any two memory locations with an additional increment of either the PEC source or the destination pointer. An individual PEC transfer counter is implicitly decremented for each PEC service except when performing in the continuous transfer mode. When this counter reaches zero, a standard interrupt is performed to the corresponding source related vector location. PEC services are very well suited, for example, for supporting the transmission or reception of blocks of data. The C163-16F has 8 PEC channels each of which offers such fast interrupt-driven data transfer capabilities.

A separate control register which contains an interrupt request flag, an interrupt enable flag and an interrupt priority bit field exists for each of the possible interrupt sources. Via its related register, each source can be programmed to one of sixteen interrupt priority levels. Once having been accepted by the CPU, an interrupt service can only be interrupted by a higher prioritized service request. For the standard interrupt processing, each of the possible interrupt sources has a dedicated vector location, In the processor 38, FLASH memory of buffer 47 is an on-chip FLASH module with a capacity of 128 K byte. It combines the advantages of a very fast read access of 32 bits in one machine cycle with protective but simple writing out rhythms for programming and erase. Read accesses of code and data are possible in any addressing mode, thus realizing the highest CPU performance with fetch of double word instructions in a single cycle. The FLASH memory in the buffer 47 is particularly useful in the present invention to perform the FLASH upgrading of the OSD firmware changes described previously with respect to FIG. 21.

Figure 12:
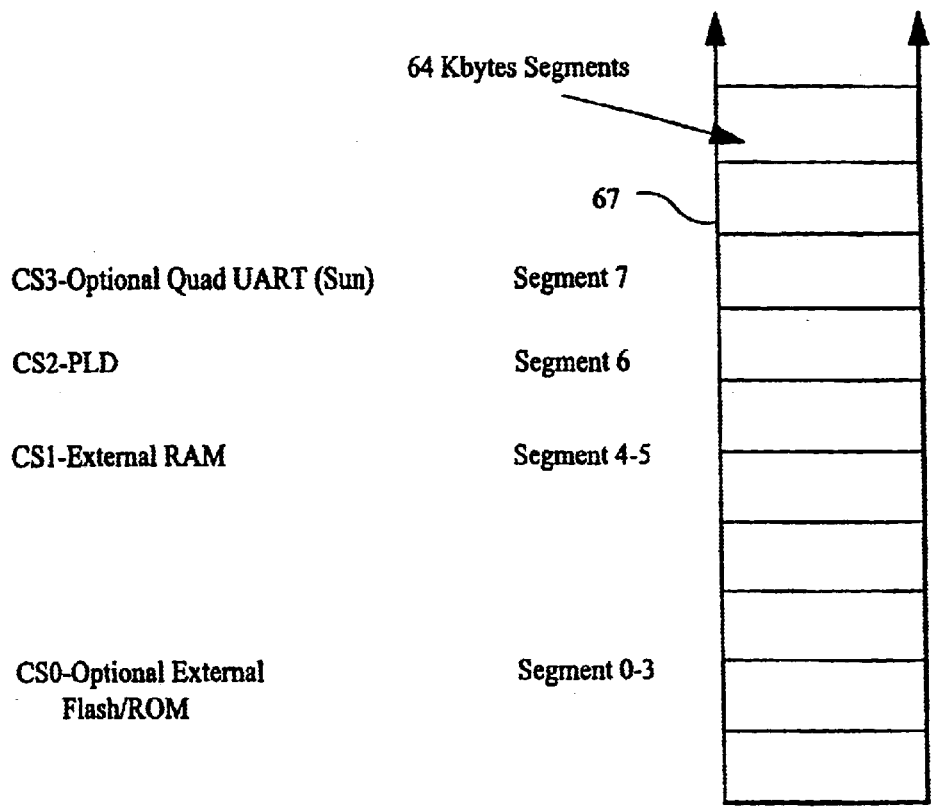
FIG. 12 is an example memory map of the processor of FIG. 8.

As shown in FIG. 12, the processor 38 is configured in a Von Neumann architecture, meaning that code and data are accessed within the same linear address space. In the example of FIG. 12, all of the physically separated memory areas including FLASH, RAM, and PLD are mapped into one common address space. In the example of FIG. 12, the memory space of 16 megabytes is arranged as 256 segments of 64 K bytes each. Each segment is divided into 4 data pages of 16 kilobytes each. Thus, the external FLASH/ROM memory is mapped into segments 0–3, the external RAM is mapped into segment 4–5, the PLD is mapped into segment 6, and the optional quad UART (for SUN data) is mapped into segment 7. The processor 38 is configured so that each chip select signal can access up to 256 kilobytes of memory space.

Next is described the software architecture to be implemented in the processor 38. The software allows multiple computers to be booted simultaneously using a single microprocessor using a timer interrupt to periodically cause the software to poll and service the requests (RTS) of one or all of the multiple computers. The software can be extended to support 4, 8, 16 or any other number of computers via the single microprocessor.

The software is designed in a compartmentalized fashion such that boundaries between software components are much like boundaries between separate physical hardware components. As used herein, the reference to the "handler" is a reference to software called from the main task loop to permit module specific processing. The phrase "application programming interface (API)" refers to a mechanism provided for communication between handlers.

The processor 38 provides the following main task loop listing. These routines are not necessarily in order.

CheckScanButton (void); (TASK #1)
CheckChannelButton (0); (TASK #2)
CheckChannelButton (1);
CheckChannelButton (2);
CheckChannelButton (3);
CheckChannelButton (4);
CheckChannelButton (5)
CheckChannelButton (6)
CheckChannelButton (7)
Ul_KbdHandler (&kbd_hdlr[0]); (TASK #3)
Ul_KbdHandler (&kbd_hdlr[1]);
Ul_KbdHandler (&mse_hdlr[0]);
Ul_KbdHandler (&mse_hdlr[1]);
CheckKbdDataRouterHandler ( ); (TASK #4)
CheckMseDataRouterHandler ( );
Cl_Handler ( ); (TASK #5)
SerialMouseHandler ( ); (TASK #6)
ChannelSwitchHandler ( ); (TASK #7)
MenuProcess ( ); (TASK #8)
CheckLEDs ( ); (TASK #9)
TimerHandler ( ); (TASK #10)

The above tasks are discussed in more detail below.

Figure 19:
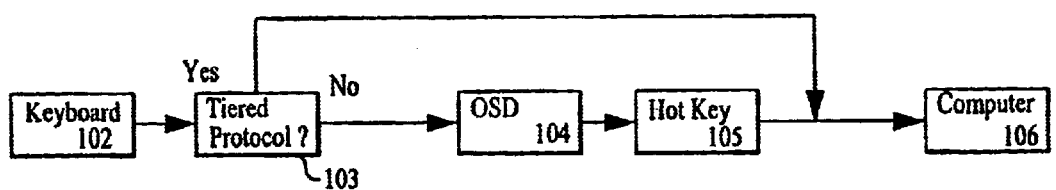
FIG. 19 is a flowchart representation of the keyboard data router module in accordance with the present invention.

Task #4 is performed by a Keyboard Data Router Module that routes keyboard data from the peripheral to various consumption regions such as the OSD, Hot Key and the Computer Interface (CI). FIG. 19 illustrates a flow diagram of these operations.

First, at step 102, the module checks the keyboard receipt buffer to determine if keyboard data has been received from a peripheral. If data is available, at step 103, it determines if the data is tiered. If so, the data proceeds directly to the computer interface (for example computer I/O 42) at step 106. If not, keyboard status is checked, keyboard OSD status is checked at step 104, and hot key status is checked at step 105. If the keystrokes are consumed by the OSD (step 104) or hot key (step 105) inquiries, then the data will not present itself to any computer. If the data is available after step 105, it is sent to the computer interface at step 106.

Of course, the processor makes appropriate keyboard data format conversions (such as scan set 1, 2, 3, etc.) to match the protocols desired for the OSD menu subsystem, the selected PC, etc.

Figure 20:
FIG. 20 is a flowchart representation of the mouse data router module in accordance with the present invention.

Task #4 also is performed by a mouse data router module that routes mouse data from the peripheral to various consumption regions such as OSD and the CI (Computer Interface). FIG. 20 illustrates a flow diagram of those processes. At step 107, the module checks the mouse receipt buffer to determine if mouse data has been received from a peripheral. The processor checks at step 104 to determine if the mouse data responds to an OSD menu. If so, the OSD subsystem may commune the mouse data and processing ends. If not, the mouse data is passed to the computer interface at step 106.

PS/2 mouse peripheral can issue data packets in several formats. The standard 2/3 button mouse sends 3 byte packets to the system. However, the creation of the "wheel" in the Microsoft Intellimouse has brought about the 4 byte data packet with the $4^{th}$ byte indicating the rotation of the wheel. Furthermore, Logitech's MouseMan+and IBM's Scrollpoint have implemented their own wheel device yet do so by reverting back to a 3 byte packet utilizing the overflow bits in Byte 1 to indicate rotation of the wheel.

It is a goal of this example embodiment of the invention that the peripheral side not be knowledgeable about the PC side in regard to peripheral devices versus PC device drivers. Mouse data must traverse through the unit or tiers of units containing all the data received by the peripheral, regardless of capability, so that the CI module can supply the selected PC driver with the appropriate data. It is possible that the data received from the peripheral contains more attributes than the current selected PC driver needs. For example, an Intellimouse peripheral will send wheel data (4 bytes) but a standard PS/2 mouse driver on the selected PC can only consume 3 bytes. Due to the unpredictability of the PS/2 mouse industry, the present embodiment provides a foundation to accommodate the mice currently in existence and future ones from a packet length perspective.

All mouse data communicated from the present switch unit (according to this example embodiment) to a tiered or paired unit will be done so in the following packet format:

| | | |
|---|---|---|
| Byte 0 | 0 Left Button | (1=Pressed) |
| | 1 Right Button | (1=Pressed) |
| | 2 Middle Button | (1=Pressed) |
| | 3 Reserved | |
| | 4 X Data Sign | (1=Negative) |
| | 5 Y Data Sign | (1=Negative) |
| | 6 X Data Overflow | (1=Overflow) |
| | 7 Y Data Overflow | (1=Overflow) |
| Byte 1 | 0–7 X Data | (Negative = Left=2's Complement) |
| Byte 2 | 0–7 X Data | (Negative = Left=2's Complement) |
| Byte 3 | 0–7 Wheel X Data | Counter in 2's complement Positive indicates movement towards the user |
| Byte 4 | 0–7 Wheel Y Data | Counter in 2's complement Positive indicates movement to user's left |
| Byte 5 | 0–7 Unused | |

The total packet length regardless of type will be 6 bytes.

Figure 10:
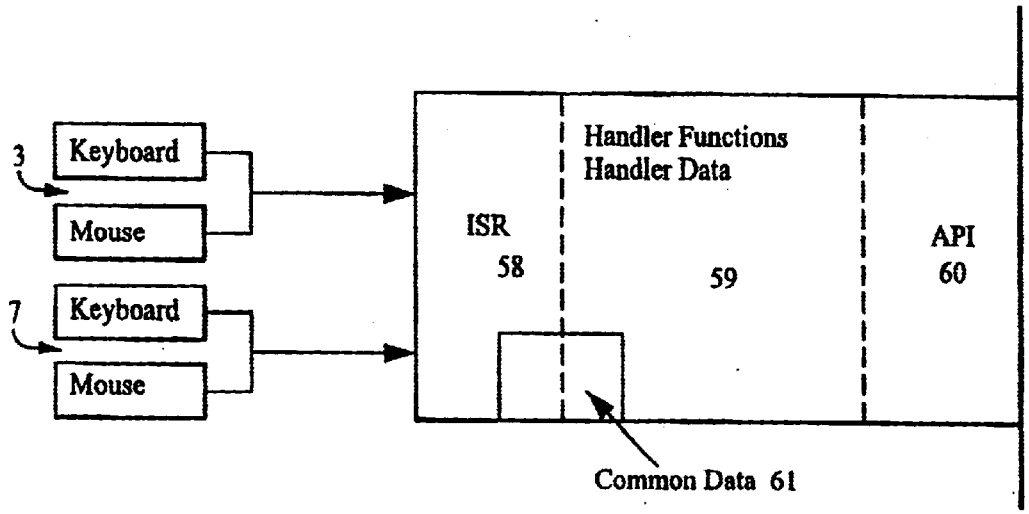
FIG. 10 is a functional schematic diagram of the software facilities on the workstation end of the present KVM switch system.

A User Interface (UI) module processes reception of data from and commands sent to the peripherals for multiple users; error handling, initialization and configurations. An example module is shown in FIG. 10. There, keyboards and mice from workstations 3 and 7 send data to Interrupt Service Routine (ISR) 58. Handler functions are performed at 59, which interfaces user interface API 60. Common data area 61 is provided for the ISR 58 and Handler 59.

The User Interface (UI) API provides programming interface used to interface with user peripherals, both keyboard and mouse devices. It performs functions using a public data type used to perform mouse data exchange between the UI, the CI and other interested parties. An example format can be:

```
typedef struct {
    byte L_button: 1; /* left button/button 1 */
    byte M_button: 1; /* middle button/button 2 */
    byte R_button: 1; /* right button/button 3 */
    byte Xl_button: 1; /* lrst extra button/button 4 */
    byte X-sign: 1;
    byte Y-sign: 1;
    byte Z-sign: 1; /* wheel sign */
    byte xDelta;
    byte yDelta;
    byte zDelta; /* wheel motion */
} MSE_DATA;
```

The User Interface API performs the following functions:

1.

Ul_KbdHandler: this function is called repeatedly from the main task loop. It is responsible for initializing keyboard operation for all user ports. It must determine if a keyboard device is active and reset failed keyboard interfaces. It must also detect the presence of a like, scaled KVM switch product and indicate this via the public API. It is responsible for maintaining the keyboard's light status and typematic rates current with the latest values provided via the API. This function may likely be implemented using a state machine.

Parameters: none.

Returns: void.

2.

Ul_KbdDataAvail: this function determines if there is at least 1 keyboard byte available in the keyboard buffer.

Parameters: userPort—selected user port.

Returns: TRUE if keyboard data is available, else FALSE.

3.

Ul_KbdDataGet: this function retrieves one keyboard byte from the keyboard buffer. It may uninhibit the keyboard as needed as a result of removing the byte.

Parameters: userPort—selected user port; kbdPtr—address of where to put keyboard byte.

Returns: TRUE if keyboard data is available, else FALSE.

4.

Ul_KbdproductType: this function determines what type of device is attached to the keyboard port, if any.

Parameters: userPort—selected user port; Symbolic product type value indicative of keyboard device type. The following symbols should be used:
KBPROD_NONE,
KBPROD_KEYBOARD,
KBPROD_AUTOVIEW,
KBPROD_FALCON,

5.

Ul_KbdSetTypematic: this function sets the keyboard typematic rate and remembers this value for later use if the keyboard must be reconfigured due to hot plugging or keyboard error.

Parameters: userPort—selected user port; rate—typematic rate to use.

Returns: none.

6.

Ul_KbdSetLightStatus: this function sets the keyboard and remembers this value for later use if the keyboard must be reconfigured due to hot plugging or keyboard error.

Parameters: userPort—selected user port; lights—light status to use Bit 0 is scroll lock, Bit 1 is num lock, and Bit 2 is caps lock.

Returns: none.

7.

Ul_KbdGetLightStatus: this function gets the current light status setting that is used when configuring the user's keyboard.

Parameters: userPort—selected user port.

Returns: Bit 0 is scroll lock, Bit 1 is num lock, and Bit 2 is caps lock.

8.

Ul_KbdFlushBuffer: this function clears all key strokes from the local memory buffer and issues a buffer clearing command to the attached keyboard device.

Parameters: userPort—selected user port.

Returns: none.

9.

Ul_KbdSendFeedback: this function accepts 3 bytes of EF feedback for transmission to the keyboard device.

Parameters: userPort—selected user port; feedBack—address of three byte buffer containing feedback bytes.

Returns: none.

10.

Ul_MseHandler: this function is called repeatedly from the main task loop. It is responsible for initializing mouse operation for all user ports. It must determine if a mouse device is active and reset failed mouse interfaces. It must detect the type of mouse device in operation and be able to report this via the public API. It is responsible for maintaining the keyboard's light status and typematic rates current with the latest values provided via the API. This function may likely be implemented using a state machine.

Parameters: none;

Returns: void.

11.

Ul_MseDataAvail: this function determines if there is at least 1 mouse packet available in the mouse buffer.

Parameters: userPort—selected user port;

Returns: TRUE if mouse data packet is available, else FALSE.

12.

Ul_MseDataGet: this function retrieves one mouse packet from the mouse buffer. It may uninhibit the mouse as needed as a result of removing the packet.

Parameters: userPort—selected user port; dataPtr—address of mouse data struct where mouse packet is placed.

Returns: TRUE if mouse data packet was available, else FALSE.

13.

Ul_MseProductType—this function determines what type of device is attached to the mouse port, if any.

Parameters: userPort—selected user port.

Returns: Symbolic product type value indicative of mouse device type. The following symbols should be used:
MSPROD_NONE,
MSPROD_INTELLIMOUSE,
MSPROD_MOUSEMAN_PLUS,
MSPROD_MARBLE_PLUS,
MSPROD_MARBLE_FX,
MSPROD_SCROLL_POINT,
MSPROD_EXPERT_MOUSE.

14.

Ul_MseSetScaling: this function sets the mouse scaling factor and remembers this value for later use if the mouse must be reconfigured due to hot plugging or mouse error.

Parameters: userPort—selected user port; scaling—mouse scaling setting.

Returns: None.

15.

Ul_MseSetResolution: this function sets the mouse resolution and remembers this value for later use if the mouse must be reconfigured due to hot plugging or mouse error.

Parameters: userPort—selected user port; resolution—mouse resolution setting.

Returns: None,

16.

Ul_MseSetSampleRate: this function sets the mouse sample rate and remembers this value for later use if the mouse must be reconfigured due to hot plugging or mouse error.

Parameters: userPort—selected user port; resolution—mouse sample rate.

Returns: None.

The keyboard and mouse interfaces receive data via interrupt service routines (ISRs) 58. Both the keyboard and mouse have such ISRs that perform the following functions:

1.

KeyboardClockISR_UserA . . . _UserB: MouseClock: This is an interrupt service routine for the attached PS2 peripheral. The same philosophy is employed for each user with a separate ISR for each user but using the same vector if the PEC is used. This routine has a higher priority than the PC side timer interrupt. It occurs on each clock edge, unless the PEC is used then it occurs on each byte. This routine is bidirectional and will both receive and transmit data. Received data is put in a receive or response buffer. In this example, the CI-wide ISR has to be serviced every 40 $\mu$s (avg clock according to spec) so the UI peripherals must be serviced within 10 US each for the case in which the 4 peripherals interrupt consecutively.

Parameters: void.

Returns: void.

To transmit a command byte to the peripheral, the UI will transmit one byte to the keyboard peripheral and set the number of expected response bytes. It then waits 40 ms for peripheral clock resp to RTS (spec reqs 10 ms). According to this example, the keyboard is inhibited for 150 $\mu$s which causes the keyboard to relinquish control if necessary (max clock period=100 $\mu$s, example spec calls for minimum of 60 $\mu$s).

To receive a 1 byte response to a command from a peripheral, the UI will check the response buffer for 20 ms while comparing the response to a desired result which was set prior to transmission of the command.

Figure 11:
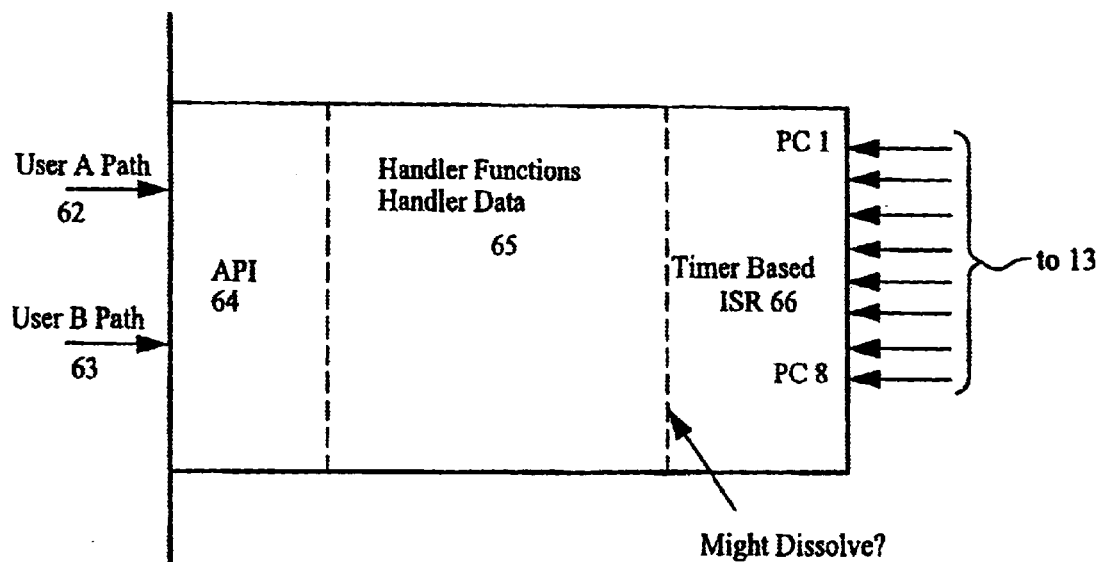
FIG. 11 is an example functional diagram of the software on the computer end the present KVM system.

On the computer-side of the switch, a Computer Interface (CI) module processes reception of commands (RTS) from and data sent to the PC for up to 8 computers (in this example); actual video channel switch is also made in this handler. FIG. 11 illustrates the computer interface module, including API 64 interfacing with data from user paths A and B (62 and 63), handler 65 and computer-side ISR (66). The ISR 66 permits simultaneous access to any computer by delivery data to and receiving data from each of the PCs through a timer-based polling of the PC ports to the ISR 66.

Prior implementations of keyboard and mouse emulation generally operated the interface to the exclusion of all other processing. In cases where the keyboard and mouse peripherals were also processed an attempt was made to inhibit the peripherals during the times when emulated devices were generating clock cycles. This made the software cumbersome and difficult to maintain.

The present embodiment uses a technique for emulating multiple computer channels concurrent with the processing of low priority software tasks and with the reception of keyboard and mouse peripheral data. This provides simultaneous clock generation for multiple channels of keyboard and mouse emulation. Also, received clocks from keyboard and mouse peripherals are processed simultaneous with generation of clocks for emulated keyboards and mice. Further, low priority software tasks are allowed to proceed without concern for the real-time aspects of emulated keyboard and mice and the processing of clocks from peripheral keyboard and mice.

The hardware employed can include:

Two open collector parallel ports, with one port connecting with the PS/2 clock signals of the emulated keyboards and mice, and the other port connecting with the PS/2 data signals of the emulated keyboards and mice.

One programmable timer with an interrupt that is capable of intervals of 1 milli-second and adjustable to 30 micro-second intervals.

If concurrent processing of peripheral clocks is desired, then edge sensitive interrupts are required for each peripheral clock signal.

According to the example algorithm, concurrent keyboard and mouse emulation begins with a low priority 1 millisecond timer interrupt. All PS/2 timing for the emulated keyboard and mouse ports is generated entirely within the timer interrupt. The timer interrupt insulates the main software tasks from real-time concerns. The time required to process the timer interrupt will vary from tens of microseconds to tens of milli-seconds. The timer interrupt is set to a low priority so that peripheral clocks can generate nested interrupts. Even though the timer interrupt is interruptible, it can not be interrupted for long durations. During the time in which the timer interrupt is generating PS/2 clock timing it should not be interrupted for periods longer than 30–40 micro-seconds, in the presently described example.

The processing of multiple channels is possible because the clock and data signals are all sampled and controlled in parallel. A 4 channel emulation requires 8 bit ports. An 8 channel emulation requires 16 bit ports.

When the timer interrupt begins, two masks are computed containing one bit for each emulated keyboard and mouse. The first mask (psenseMask) is derived from the power sense inputs and is used to enable operation of each port. The second mask (nsMask) is derived from PS/2 data signals indicating an existing RTS condition.

Next, a pattern of transmit bits is computed for each port. Transmit bits are composed for all ports whether they are transmitting, receiving, or idle. The pattern of bits is different depending on the type of operation. The bit pattern generated for a transmitting port is composed of a start bit, data bits, a parity bit, and a stop bit. The bit pattern generated for a receiving port is all ones except for a line control bit which is loaded into the stop bit position. The bit pattern for ports that are idle is all ones.

Next, a txMask is computed for each port that is transmitting data.

Next, a respMask is computed for each port that is transmitting responses.

Next, a clkMask is computed that will enable clkMask or no work was performed during the previous loop of the time handler, the timer is configured to interrupt again after 1 milli-second and the interrupt service is ended.

In this example, the Tx data and Rx data arrays overlap. Twelve bytes were allocated for the overlapped arrays. The first 11 bytes were used as the Rx data array. The last 11 bytes were used as the Tx data array. When there is sufficient memory this overlap is unnecessary.

At this point the emulated keyboard and mouse clock generation begins for 11 cycles. The pacing is controlled entirely by expiration of the 30 micro-second timer. This insures that real time is measured in spite of possible nested interrupts from peripheral keyboard and mouse clocks.

The timer is now configured to expire at intervals of about 30 micro-seconds. It begins in the expired state.

For 11 clock cycles the following is repeated:

(PS/2 clock FALLING edge cycle)

Wait for time to expire.

Read PS/2 data port and store in Rx/Tx data array.

Advance pointer Rx/Tx data array.

Write PS/2 data port from Rx/Tx data array ORed with clkMask.

Update clkMask with inverted bits read from PS/2 clock port.
(This terminates clocks and data on ports that are inhibited).

Reset timer to 30 micro-seconds.

Disable interrupts

Output clkMask on PS/2 clock port.
(This produces the falling PS/2 clock edge).

Start timer

Enable interrupts (PS/2 clock RISING edge cycle)

Wait for time to expire.

Reset timer to 30 micro-seconds.

Disable interrupts.

Output ones on PS/2 clock port.
(This produces the rising PS/2 clock edge).

Start timer

Enable interrupts

When all clock cycles are complete, write ones to the PS/2 data port to remove outstanding line control bits.

The first byte of the Rx data array contains start bits from all ports that received. The second byte of the Rx data array contains data bit 0 from all ports that received and so on.

At this point the Rx data array is rotated from serial to parallel.

For each port still enabled in the clkMask, update transmit queues, response queues, or process received bytes.

Continue at the beginning of the timer interrupt. Interrupt processing will end when no more can be performed because of inhibit or lack of transmit bytes.

The Computer Interface (CI) API 64 uses the following public data types:

define MAX_PC 8 typedef struct

```
{
byte psense; //Power sense detected
byte enabled; //Keyboard is enabled
byte leds; //Bit 0=scroll lock, bit 1=num lock, bit 2=cap lock
byte typematic; //Typematic rate, same format as keyboard
byte scanSet; //Scan code set 1, 2, or 3
byte flush; //True to flush keyboard buffers
byte cbType; //0=keyboard, 1=Raven, 3=Falcon
}Cl_KbdConfig;
typedef struct
{
byte psense; //Power sense detected
byte enabled; //Mouse is enabled
byte sampleRate; //Same format as mouse
byte scaling2_1; //Scaling type
byte resolution; //Same format as mouse
}Cl_MseConfig;
```

The Computer Interface API performs the following functions:

1.
Cl_Int: this function initializes the CI subsystem for operation. This function is called only once following power on reset.
Parameters: void.
Returns: void.

2.
Cl_KbdReady: this function determines whether the indicated PC channel is ready to accept one more byte of keyboard data for transmission.
Parameters: byte pc—number of computer port affected (0 . . . 7).
Returns: byte—TRUE if the channel is ready to receive new keyboard data.

3.
Cl_KbdSend: this function accepts one keyboard byte for transmission via the indicated PC channel.
Parameters: byte pc—number of computer port affected (0 . . . 7).
Returns: void.

4.
Cl_KbdConfigChanged: this function determines if the keyboard configuration of the indicated PC channel has been changed via PC commands.
Parameters: byte pc—number of computer port affected (0 . . . 7).
Returns: byte—TRUE when the configuration has been changed since Cl_KbdGetConfig( ) was last called.

5.
Cl_KbdGetConfig: this function retrieves the current configuration for the indicated PC channel. Parameters: byte pc—number of computer port affected (0 . . . 7), Cl_KbdConfig *cfg—pointer to keyboard config info.
Returns: void.

6.
Cl_SetScanCodeSet: this function is used to override the current keyboard scan code set in use by the indicated PC channel.
Parameters: byte pc—number of computer port affected (0 . . . 7), byte b—which scan set to set (1,2,3).
Returns: void.

7.
Cl_EF_FeedBackAvail: this function determines if EF feedback is available from the indicated PC channel.
Parameters: byte pc—number of computer port affected (0 . . . 7).
Returns: byte—TRUE if new EF feedback is available since Cl_EF_FeedBackGet( ) was last called.

8.
Cl_EF_FeedBackGet: this function retrieves the most recent EF feedback that was received from the indicated PC channel.
Parameters: byte pc—number of computer port affected (0 . . . 7), byte *feedBack[3]—pointer to a 3 byte array that will receive the EF feedback bytes.
Returns: void.

9.
Cl_MseReady: this function determines if the mouse for the indicated PC channel is ready to receive a new mouse packet for transmission.
Parameters: byte pc—number of computer port affected (0 . . . 7).
Returns: byte—TRUE if the channel is ready to receive a new mouse packet.

10.
Cl_MseSendPacket: this function accepts a new mouse packet for transmission via indicated PC channel. The mouse packet is translated from the neutral format contained in MSE_DATA to the format currently being emulated by the mouse interface for the given computer port.
Parameters: byte pc—number of computer port affected (0 . . . 7), MSE_DATA *pkt—pointer to mouse packet to transmit.
Returns: void.

11.
Cl_MseSendByte: this function accepts a single mouse byte for transmission via indicated PC channel.
Parameters: byte pc—number of computer port affected (0 . . . 7), byte b—byte to transmit.
Returns: void.

12.
Cl_MseEnable: this function overrides mouse enabled status to that the mouse interface for the indicated PC channel is enabled.
Parameters: byte pc—number of computer port affected (0 . . . 7).
Returns: void.

13.
Cl_MseConfigChanged: this function determines if the mouse configuration of the indicated PC channel has been changed via PC commands.
Parameters: byte pc—number of computer port affected (0 . . . 7).
Returns: byte—TRUE if the configuration has been changed since Cl_MseGetConfig( ) was last called.

14.
Cl_MseGetConfig: this function retrieves the latest mouse interface configuration for the indicated PC channel.
Parameters: byte pc—number of computer port affected (0 . . . 7), Cl_MseConfig * cfg—pointer to mouse config info.

Returns: void.

15.
C1_MseSetProductType—this function sets the mouse product type that is to be emulated by the computer interface following the next RESET command received from the attached computer. Until a RESET command is received the type of mouse emulation for a given computer port remains constant.

Parameters: byte productType—product type code from the following list of symbolic constants:
MSPROD_INTELLIMOUSE, (default)
MSPROD_MOUSEMAN_PLUS,
MSPROD_MARBLE_PLUS,
MSPROD_MARBLE_FX,
MSPROD_SCROLL_POINT,
MSPROD_EXPERT_MOUSE.

16.
C1_Timer ISR: GPT1—Timer 2 Interrupt Service Routine (ISR) for timer 1 overflow interrupt. Periodically activates the PC side emulation logic to service RTS conditions to receive bytes from one or more PCs and to send data and responses to one or more PCs.
Parameters: void.
Returns: void. Notes: Interrupts when T2 underflows or hits 0x0000 (count-down timer mode).

Task #6 in the Main Task Loop is performed by a serial mouse handler within the CI module, which processes any serial mouse data that is to be transmitted to the PCs.

Figure 15:
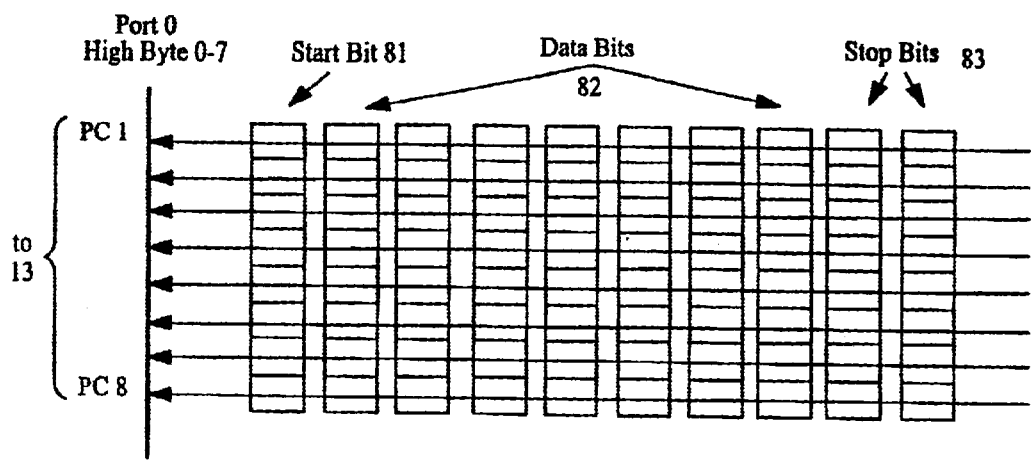
FIG. 15 is a functional schematic diagram of the serial mouse hander in accordance with an example embodiment of the present invention.

According to the serial mouse procedure:
1. The Serial Handler is called from Main Task Loop or CI Handler
2. The CI data structure is checked for all active Serial Mouse port PCs
3. Mouse data to be sent to PCs (max 2 at any given time) is translated from a mouse packet format used by the KVM switch itself to Serial Mouse packet format and stored in Serial Handler data structure
4. As shown in FIG. 15, the Serial Handler data structure contains a serial mouse packet for each of the 8 PCs regardless of whether the PC is serial mouse capable.
5. The first byte of each serial mouse packet is placed into an IRAM 10 byte array used for transmission to all of the PCs. All 1's are sent to PCs that are not receiving actual serial mouse data.
6. In this example, the serial mouse port requires data to be sent at a 1200 bps rate. A time will be used to generate the PEC Service Request at the 1200 bps rate. That time has an auto reload register to facilitate the 1200 bps rate. Each PEC Service Request will produce a transfer of data from IRAM to Port 0.
7. The final PEC transfer will generate an interrupt. The ISR will either disable the timer if there is no more serial mouse data to send OR move the next set of bytes from the CI data structure to the Serial Handler data structure in IRAM. The Serial Handler data structure may be double buffered to inhibit any latency between transmission of bytes.

The high byte of Port 0 is wired to the transmit data of each serial mouse port. Each of the 10 bytes represent a set of bits for each PC. First, the start bits 81 are transmitted to each PC followed by the data bits 82 and stop bits 83. The Peripheral Event Controller (PEC) is utilized for transferring each set of bits to Port 0.

Tasks #1 and #2 from the Main Task Loop are performed by a Pushbutton Module to process and debounce the user input to the system via the 1 Next/Scan and 8 channel select front panel pushbuttons. This logs pushbutton events such as Make, Break, Next, Scan, Reset, etc. into data structures owned by the buttons module.

A Pushbutton API employs a data structure according to the following format:

```
#define BUTTONS_NONE 0   //No button action
#define BUTTONS_NEXT 1   //Button pressed for <1 second
#define BUTTONS_SCAN 2   //Button pressed for 1-3 seconds
#define BUTTONS_RESET 3  //Button pressed for >3 seconds
```

The functions performed by the Pushbutton API include:

1.
BUTTONS_GetChannelButtons—this function returns the status of the channel select pushbuttons. Bit 0, when set, indicates that the channel A button is pressed. Bit 1, when set, indicates that the channel B button is pressed: and so on. The word value can be used for up to 16 channel selection buttons. Buttons are sampled at 20 Hz or less to effect debounce behavior.
Parameters: void.
Returns: word: Notes: 1) Debounced via 20 Hz sampling in BUTTONS_ButtonTimer; 2) Action request submitted Switching Handler is button pressed.

2.
BUTTONS_GetScanNextButton—this function returns Next, Scan, or Reset indication upon button release after measured contact duration. The Scan/Next button is sampled at 20 Hz or less to effect debounce behavior. Step—less than 1 s, Scan—between 1 and 3 s and Reset—more than 3 s.
Parameters: void.
Returns: byte: Notes: 1) Debounced via 20 Hz sampling in BUTTONS_ButtonTimer; 2) Button ignored on cascaded units.

3.
BUTTONS_ButtonTimer—this function is called at 20 Hz by the timer sub-system to handle button debouncing and timing.
Parameters: void.
Returns: void.

Other main Task Loop functions include controlling the status and channel select LEDs (Task #9), handling timers (task #10), and calling up the OSD menu subsystem (Task #8). The OSD subsystem will be described in more detail below.

Figure 14:
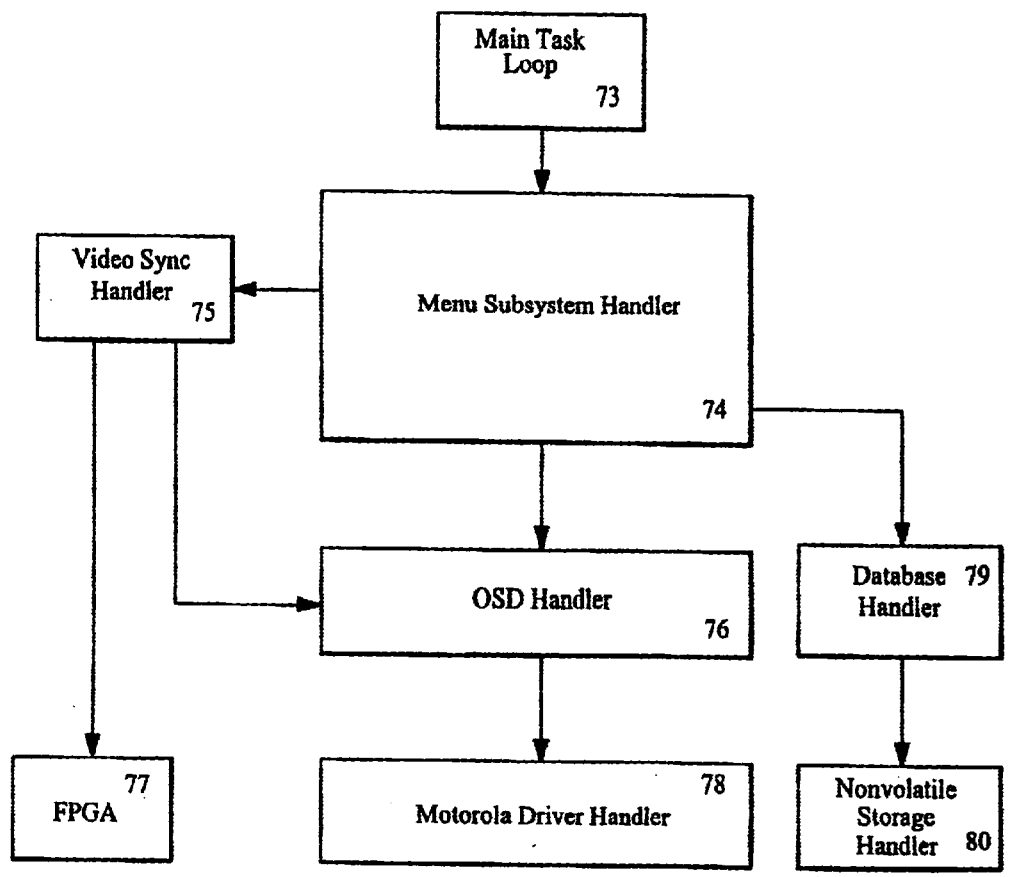
FIG. 14 is a flowchart of functions of an example embodiment of the present invention.

An On Screen Display (OSD) Module is shown in FIG. 14. The OSD menuing is called from the Main Task Loop 73 (Task #8). The Main Task Loop 73 calls the Menu Subsystem API 74 which provides a mechanism for communication with the Menu Subsystem. The menu system requires keyboard inputs be processed and translated before consumption by the menu system. The menu system requires raw make/break key codes for all key presses, cooked make/break codes for all key presses, and shift state flags for Shift, Control, and Alt. Raw key codes are a set of unique key codes. There is one code for each key on the entire keyboard. The menu system needs to receive the make and break code for every key press. This includes the shift, alt, and ctl keys as well. The codes from Scan Set 3 can be used.

Cooked key codes are ASCII plus function keys. Cooked key codes are adjusted by the state of NumLock, CapsLock, Shift, Control, and Alt keys. Currently, the menu system uses isprint( ) keys, control keys such as tab, backspace, delete, carriage return, arrow keys, and the function keys F1 . . . F12. These in conjunction with the shift state flags account for all the current needs of the menu system.

No menu subsystem is called by a key sequence such as "CTRL-CTRL". After Ctrl-Ctrl is pressed and the make/break codes are passed through to the computer, the channel list can be started. At this point the raw and cooked key codes can be directed to the menu system. The point at which the switch over occurs is decided by non-menu system code. The reverse switch over is decided entirely by the menu system. Each time through the task loop the main code checks a flag in a global structure, associated with the menu system, to determine precisely when the menu system relinquishes ownership of the keyboard. This is done so that the menu system can properly consume all outstanding break codes before key codes are directed to a computer.

The menu system 74 can be called (by "CNTL-CNTL" for example) or can be initiated once each loop of the Main Task Loop. When activated, the menu subsystem creates a menu of computer channels drawing from database 79 and storage 80. That contains User Configuration information such as channel naming, display characteristics, etc. Key codes are then fed into the menu system including make/break, ASCII, and raw key codes. The menu system signals the main loop when the menu is done and/or an action is requested. The menu can also instruct the main loop to stop feeding the menu system with make and break codes. In all cases this is the means to terminate feeding of key codes to the menu system.

The OSD Handler API 76 provides a mechanism for communication with the OSD chip (such as manufactured by and available from Motorola). This OSD subsystem 76 provides the means by which the MENU subsystem 74 affects the OSD device. Through these functions a local memory representation of the OSD device is maintained. Functions that alter the content of the display such as the printing functions and mode controlling functions merely alter the content of the local memory representation. It is the purpose of the OsdProcess( ) function to incrementally transfer the content of the OSD local representation to the actual OSD device in an optimized manner.

Of course, the present menuing system must support more than one user with the common processor. In this example, although there is one subsystem, each user port is processed independently.

Functions on the API include:

1) initializing the OSD device at start-up to default conditions, clearing the display memory, and setting the device to default coloring and sizing;
2) detection of screen status (under construction versus static);
3) timing;
4) clearing of text from the OSD memory beginning at the current printing position to the end of the line for a particular user port;
5) clearing the entire OSD text memory so that the text is blank and homes the printing position to (0,0);
6) enabling or disabling the OSD display for a specified user port;
7) disabling the display of a blinking cursor on the OSD display;
8) enabling the display of a blinking text cursor on the OSD;
9) selecting which OSD character code is used for a blinking cursor;
10) setting the position of the blinking text cursor;
11) setting colors for background and text;
12) setting the attributes of a text line;
13) setting the text printing position of the OSD subsystem. The text printing position controls where text is printed;
14) printing a single character into the OSD memory at the current text printing position with the current text color selection and then advancing the printing position by one;
15) printing a string of text into the OSD memory beginning at the current text printing position with the current text color selection. The printing position is advanced once for each character printed;
16) choosing which of two colors available to a given line of text are used for each character subsequently written to the OSD using the OSD printing functions;
17) defining the position of a specific background window;
18) controlling placement of the entire OSD display relative to the upper left corner of the display monitor and the vertical height of each OSD display line;
19) controlling the vertical size of the display characters and the number of horizontal dots generated by the OSD device;
20) adjusting the number of horizontal lines used by each row of the OSD text. The number of lines needs to be adjusted depending upon the number of measured horizontal lines generated by the sync source 75. The sync source is either the PC video that is online or the local sync generator used in the absence of PC video;
21) determining specific horizontal and vertical video dot position;
22) computing the vertical and horizontal line position when given a value for OSD vertical and horizontal position control;
23) computing the number of vertical lines used by the OSD display within the indicated set of text rows;
24) computing the horizontal dots used by OSD display within the indicated set of text columns;
25) scrolling a region of text previously written to the OSD display;
26) saving the entire context of the OSD into local memory for later restoration;
27) restoring the entire context of the OSD display from local memory previously saved;
28) activating a total refresh of the OSD from the local memory representation;
29) configuring the OSD subsystem prior to generating a display by configuring the local sync generation and the OSD display chip for compatible operation;
30) initiating the detection of incoming sync signals, including the type and rate of the sync pulses; and
31) determining when the sync detection process is complete and if so returning the results.

The OSD Driver Handler Device API 78 provides a *mechanism for communication with the OSD chip, such as the Motorola OSD device known as the MC141543 "Advanced Monitor On-Screen Display." The driver handler 78 writes bytes to the OSD display memory and generates timing for sending bytes of command, address, and data to the OSD device.

Figure 13:
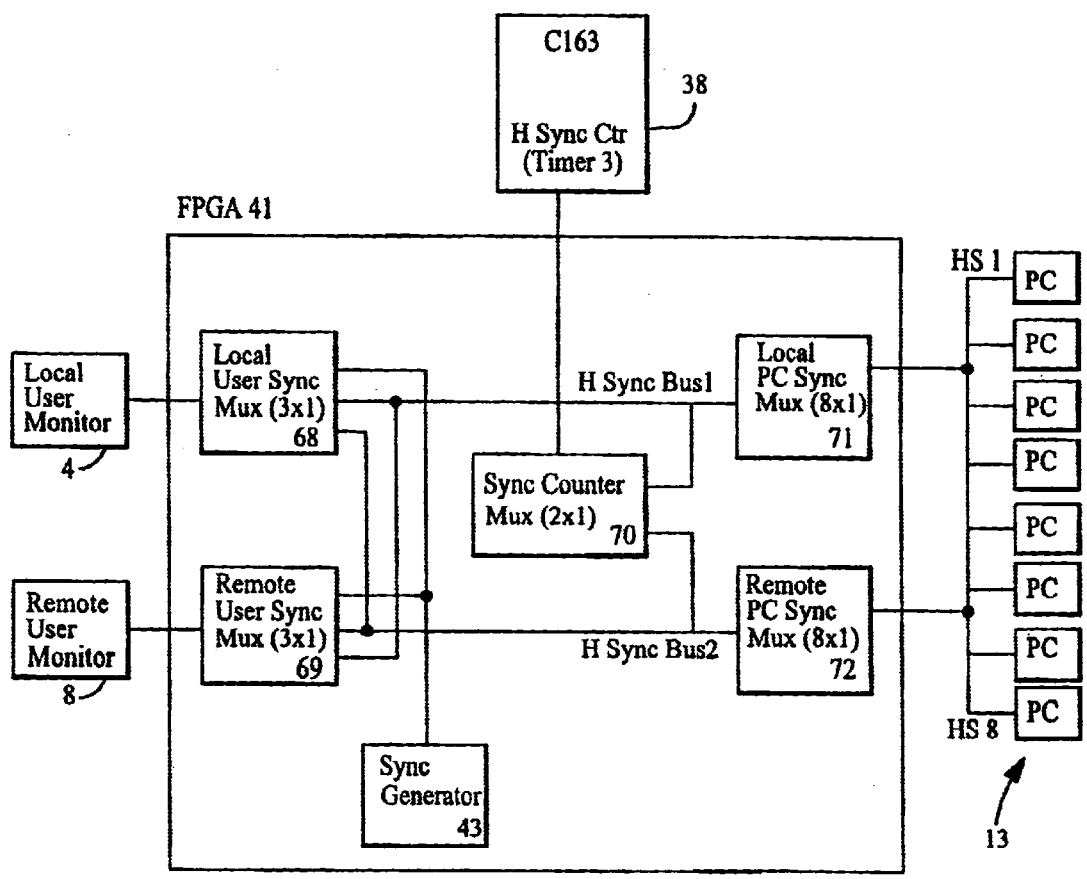
FIG. 13 is an example electrical schematic of the FPGA of FIG. 8.

The Video Sync Handler 75 counts Vertical and Horizontal syncs for both user paths. Determination can be made by the menu subsystem 74 to use the computer provided syncs (separate H & V, no composite) OR use syncs generated by the on board FPGA 77 (see element 43 of FIG. 8) as the source for the OSD. FIG. 13 illustrates horizontal sync processing by way of example.

The processor 38 provides timers (see FIG. 9) that are employed for the Vertical Sync Counter and Horizontal Sync Counter.

At least once per second, the video sync handler will execute a state machine 70 that will count the number of horizontal sync pulses between two vertical sync pulses. The vertical sync counter will use a short ISR to start/stop the horizontal sync counter accordingly. The number of horizontal sync pulses taken during the most recent measurement cycle will be available to the menu subsystem. Syncs from the computers 13 are received by dual muxes 71 and 72 and placed on local and remote user sync buses. Local and remote muxes 68 and 69 will take syncs from either the sync buses (from the computers) or from the sync generation 43 for application to the local and remote monitors 4/8.

Figure 17:
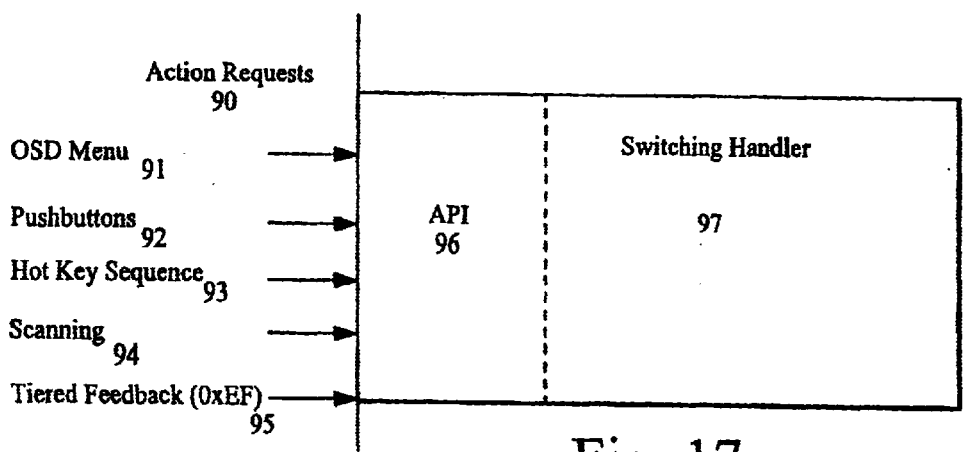
FIG. 17 is an example embodiment of the channel switching software module in accordance with an example embodiment of the present invention.

Since the present switch accommodate multiple users, the OSD system must handle switch commands from all users. A channel switching module processes reception of action requests from multiple users to switch channels from various sources such as pushbutton, hot key sequences, scanning and the OSD menu. FIG. 17 illustrates such a module.

In FIG. 17, the goal is to keep the various subsystems such as the Hot Key Handler etc. separate from each other, and from the switching Handler. A bulletin board type mentality will be used so that any module/handler external to the switching handler 97 can post an action request on the switching handler bulletin board via API 96. The Switching Handler, called by the main task loop, checks the bulletin board for any action requests that may be posted. The action request will consist of at least the user number submitting the request and the desired destination channel.

Each switch unit, whether base or tiered, will be responsible for tracking both user paths within that unit. In other words, each unit must know which PC is currently selected by which set of peripherals, local or remote.

Figure 16:
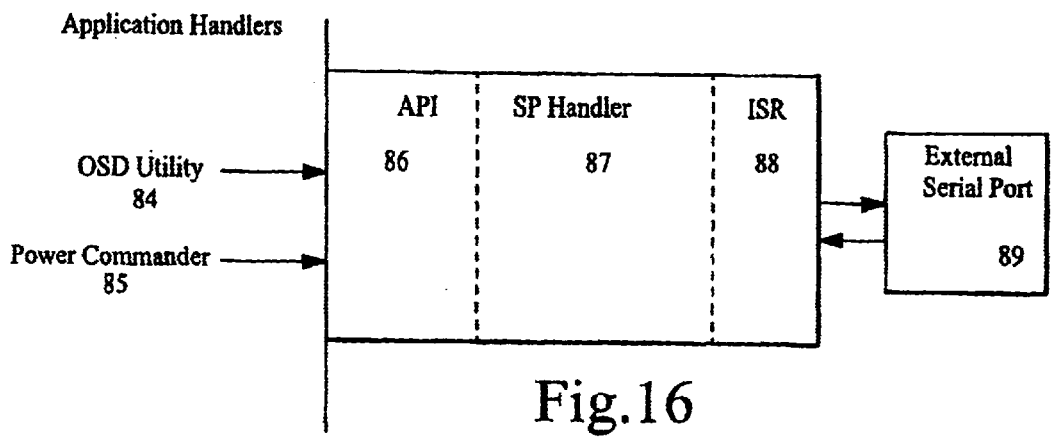
FIG. 16 is an example embodiment of a serial port software module in accordance with an example embodiment of the present invention.

A Serial Port Module may also be employed to handle the serial port I/O on the switch box, including applications such as OSD utilities, "Power Commander" utilities offered commercially by Cybex Computer Products, Corp, etc. FIG. 16 illustrates the serial port 89, interrupt service routine 88, handler 87, and API 86 interfacing with example utilities such as the OSD utility 84 and Power Commander 85. The Serial Port Module provides a mechanism for various applications to use and communicate with the external Serial Port (DB9). Serial port data is transmitted and received via interrupts.

In an alternative embodiment of the tiered (cascaded) structure of FIG. 6, the present switches include a method to detect the attachment of another switch product. This method was founded on the use of the Read ID keyboard command. Referencing FIG. 18, according to the IBM Keyboard Specification, the standard response to the Read ID Keyboard command is a constant 16 bit value (0x83AB). Previously, it was believed that all keyboards responded to the Read ID consistently to the point that KVM switch products did not issue the Red ID command but instead emulated the known response to the associated computer. This behavior was exploited by developing switch products to respond with a manufacturer ID (High Byte) and Product Code (Low Byte) in response to the third consecutive Read ID command.

Figure 18:
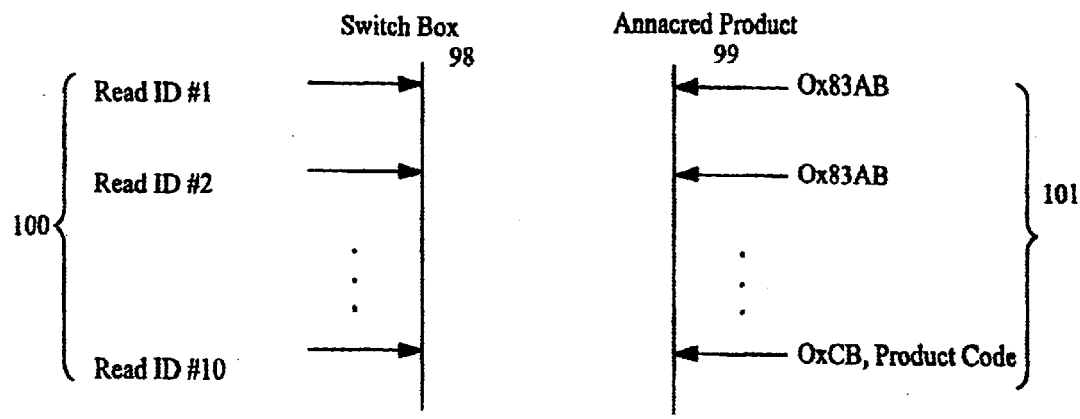
FIG. 18 is a schematic representation of a recognition method in accordance with the present invention to recognize the attachment of another KVM switch product.

Overall, the approach worked well except that some PCs (for example, the IBM 9585 and the IBM 300XL) also issue 3 consecutive Read ID commands in their boot sequence. Thus, prior KVM switches using the 3 Read ID command technique sometimes incorrectly determined itself to be attached to another like KVM switch product when only a PC was attached. The number of Read ID commands issued is increased to 10, as shown in FIG. 18. The greatest number of Read ID commands that are known to have been issued by a PC is 5 by the IBM 9585.

In an effort to reduce the communication traffic between KVM switch boxes, a shorthand protocol can be implemented to allow the Base box to communicate with the Tiered box with small overhead. Such a shorthand can employ a tiered protocol that consists of a prefix byte followed by a command byte. The command byte will instruct the Tiered unit to perform various tasks such as channel switches. Additional prefix bytes can be used to enhance the tiered protocol.

As previously described, the present invention also employs flash memory upgrading. Presently, Rose Electronics of Houston is believed to offer flash upgrading in a KVM switch called Ultraview, which is believed to provide the user two methods of flash upgrading:

1) using terminal program (like Hyperterminal) to send an ASCII text file, with the terminal screen used to update the user on the progress;
2) using file copy to send an ASCII text file, with LEDs used to update the user on the progress.

A problem with those methods is that the user interfaces are inadequate to monitor the file transfer. Further, there is no data flow control implemented which means menu data can be lost on the dump due to slow communication linking or bus overloading. Compounding the problem, the user interface's inadequacy leaves the user without good feedback that a data dump was unsuccessful and why.

In a first alternative embodiment of FIG. 21, flash downloading, a Terminal Program is employed such as (ProComm, Hyperterminal, etc.) using ASCII file transfer for the PC but with ASCII file transfer support developed on the embedded side. Such support can be either an Xmodem protocol or a slowed baud rate. Alternatively, the Terminal Program can be employed with the processor 38 having a dedicated flash download mode (see element 47 of FIG. 9) that will not be overloaded by a flash download.

In a second alternative embodiment, a DOS based utility is provided for PC download. This improves the user interface and has integrated flow control.

In a third alternative embodiment, a Custom Windows application is provided for PC download. This provides the most user-friendly, simple GUI for integrated flow control.

In any case, to program the on-chip Flash memory of the processor 38, a bootstrap loader (BSL) loads the flash programming routines and the program code via serial interface to the KVM switch. The flash programming routines and programming code then control future flash upgrading via the embodiment of FIG. 21.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A KVM switch, including:
   hardware components, including:
      two or more computer ports to respectively link to two or more computers at keyboard, mouse and video ports of each of said computers;

a computer I/O interface to interface keyboard, mouse and video data with each of said computer ports;

a single microprocessor communicating with the computer I/O interface; and two or more workstation ports to respectively link to two or more workstations each having a keyboard, mouse and video monitor, said workstation ports communicating with the single microprocessor; and software modules, including:

a user interface module to give and receive keyboard, mouse, and video data to and from the workstation ports under the control of the single microprocessor;

a user interface interrupt service routine to precipitate the transfer of said keyboard, mouse and video data to and from the workstation ports via interrupts on assigned lines of the workstation ports;

a computer interface module to give and receive keyboard, mouse and video data to and from the computer ports under the control of the same single microprocessor; and a computer interface interrupt service routine to precipitate the transfer of said keyboard, mouse and video data to and from the computer ports and computer I/O via timer-based interrupts on assigned lines of the computer ports, wherein the computer interface interrupt service routine polls each of the assigned lines of the computer ports on a periodic basis.

2. A KVM switch according to claim 1, further including:
a data extender interfaced between at least one of the workstation ports and at least one corresponding workstation.

3. A switch as in claim 1 wherein the single microprocessor further includes flash memory.

4. A switch as in claim 1 wherein the software modules further include:
an on-screen display module to generate on-screen display menus in accordance with an on-screen display configuration.

5. A switch as in claim 4, wherein the single microprocessor further includes flash memory and the on-screen display configuration is stored in the flash memory.

6. A switch as in claim 5, wherein the hardware further includes a serial port and the software modules further include a serial port interface module to precipitate a transfer of new on-screen display configuration data to the flash memory.

7. A switch as in claim 1, wherein the hardware further includes a video subsystem to receive video signals from the computer ports and deliver the video signals to single microprocessor for delivery to selected ones of the workstation ports.

8. A switch as in claim 7, wherein the hardware further includes an on-screen display subsystem, in communication with the video subsystem, to generate on-screen menu signals, said video subsystem generating monitor video signals having a combination of said video signals from the computer ports and the on-screen menu signals for delivery to the selected ones of the workstation ports.

9. A switch as in claim 8, wherein the software further includes an on-screen display module to control generation of the on-screen menu signals by the on-screen display subsystem.

10. A switch as in claim 8, wherein the hardware further includes an internal sync generator, and wherein the video subsystem selects a sync signal from either the internal sync generator or from the video signals received from the computer ports.

11. A method of switching keyboard, mouse and video data between multiple computers and multiple workstations, comprising:

providing computer-side ports, one port for each of the computers;

selecting some of the computers for communication with some of the multiple workstations;

bi-directionally communicating the keyboard, mouse and video data between the some selected computers via corresponding ones of the computer-side ports and a single microprocessor under the control of a computer-side interrupt service routine that continuously polls the computer-side ports;

translating the keyboard, mouse and video data into one or more protocols suitable for, respectively, the some selected workstations;

providing peripheral-side ports, one port for each of the workstations;

bi-directionally communicating the keyboard, mouse and video data between the some selected workstations via corresponding ones of the peripheral-side ports and the single microprocessor under the control of a peripheral-side interrupt service routine.

12. A method of communicating data between at least two computers and at least two computer workstations, comprising:

providing first and second workstation ports communicating with, respectively, first and second ones of the computer workstations;

providing first and second computer ports communicating with, respectively, first and second ones of the computers;

using a single microprocessor, continuously polling the first and second workstation ports, via an interrupt service routine, to correspondingly retrieve and provide current keyboard, mouse and video data to and from, respectively, the first and second workstations via corresponding ones of the first and second workstation ports;

using the same single microprocessor, continuously polling the first and second computer ports, via another interrupt service routine, to retrieve and provide the current keyboard, mouse and video data to and from a selected one of the at least two computers via a corresponding one of the first and second computer ports.

13. A method as in claim 12, further including:
receiving the current keyboard data from the first workstation according to a first keyboard protocol suitable for the first workstation and translating that current keyboard data into a second keyboard protocol suitable for the selected computer; and receiving the current keyboard data from the selected computer according the second keyboard protocol suitable for the selected computer and translating that current keyboard data into the first keyboard protocol suitable for the first workstation.

14. A method as in claim 12 further including:
receiving the current mouse data from the first workstation according to a first mouse protocol suitable for the first workstation and translating that current mouse data into a second mouse protocol suitable for the selected computer; and receiving the current mouse data from the selected computer according the second mouse protocol suitable for the selected computer and translating that current mouse data into the first mouse protocol suitable for the first workstation.

15. A method as in claim 12 further including:

receiving the current video data from the first workstation according to a first video protocol suitable for the first workstation and translating that current video data into a second video protocol suitable for the selected computer; and receiving the current video data from the selected computer according the second video protocol suitable for the selected computer and translating that current video data into the first video protocol suitable for the first workstation.

16. A method as in claim 12 wherein the first and second computers issue requests on the first and second computer ports and the single microprocessor continuously polls the first and second computer ports, via another interrupt service routine, to retrieve and provide the requests from each of the first and second computers.

17. A method of communicating keyboard, video and mouse signals between disparate workstations and computers using a switch, comprising:

providing a plurality of computer ports, one per computer, to link the switch to each of the computers via corresponding ones of the computer ports;

providing a plurality workstation ports, one per workstation, to link the switch to each of the workstations via corresponding ones of the workstation ports;

providing a channel selector for each workstation user to make a selection of any of the computers;

checking the channel selector and assigning a computer port for each workstation based on the selection of each workstation user;

receiving respective keyboard and mouse signals from each of the workstation ports;

polling the respective workstation ports, one-by-one, and retrieving the keyboard and mouse signals therefrom;

polling all of the computer ports, one-by-one, and submitting the keyboard and mouse signals to ports corresponding to the selected computers;

receiving respective video signals from the computer ports selected by the workstation users;

polling all of the computer ports, one-by-one, and retrieving from ports corresponding to the selected computers the respective video signals; and polling the respective workstation ports, one-by-one, and submitting the respective video signals thereto.

\* \* \* \* \*